(12) United States Patent
Maruyama et al.

(10) Patent No.: US 10,203,808 B2
(45) Date of Patent: Feb. 12, 2019

(54) POSITION INPUT DEVICE AND DISPLAY DEVICE HAVING POSITION INPUT FUNCTION

(71) Applicant: SHARP KABUSHIKI KAISHA, Sakai, Osaka (JP)

(72) Inventors: Takenori Maruyama, Sakai (JP); Hiroyuki Ogawa, Sakai (JP); Kazutoshi Kida, Sakai (JP); Kenshi Tada, Sakai (JP); Shinji Yamagishi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/580,378

(22) PCT Filed: Jun. 3, 2016

(86) PCT No.: PCT/JP2016/066582
§ 371 (c)(1),
(2) Date: Dec. 7, 2017

(87) PCT Pub. No.: WO2016/199691
PCT Pub. Date: Dec. 15, 2016

(65) Prior Publication Data
US 2018/0136785 A1   May 17, 2018

(30) Foreign Application Priority Data

Jun. 10, 2015 (JP) ................................ 2015-117308

(51) Int. Cl.
*G06F 3/041* (2006.01)
*G02F 1/1333* (2006.01)
(Continued)

(52) U.S. Cl.
CPC .......... *G06F 3/0418* (2013.01); *G02F 1/1333* (2013.01); *G02F 1/13338* (2013.01);
(Continued)

(58) Field of Classification Search
CPC ........ G06F 3/044; G06F 3/041; G06F 3/0418; G06F 3/047; G06F 2203/04102;
(Continued)

(56) References Cited

U.S. PATENT DOCUMENTS

| | | | |
|---|---|---|---|
| 2012/0062511 A1* | 3/2012 | Ishizaki | G06F 3/0412 345/174 |
| 2014/0055412 A1* | 2/2014 | Teramoto | G06F 3/0412 345/174 |

(Continued)

FOREIGN PATENT DOCUMENTS

JP   2013-003603 A   1/2013

*Primary Examiner* — Md Saiful A Siddiqui
(74) *Attorney, Agent, or Firm* — ScienBiziP, P.C.

(57) ABSTRACT

A touch panel pattern TPP includes detection electrodes 38, driving electrodes 39, floating electrodes 45, and reference width floating electrode 48, a smallest width floating electrode 49, and an intermediate width floating electrode 50 that are included in the floating electrodes 45. The smallest width floating electrode 49 is disposed at an end-side one of the floating electrodes 45 with respect to a second direction and has a smallest width. The intermediate width floating electrode 50 is disposed closer to the end-side one than the reference width floating electrode 48 is and closer to a middle than the smallest width floating electrode 49 is and has a width FW2 smaller than that of the reference width floating electrode 48 and larger than that of the smallest width floating electrode 49.

8 Claims, 14 Drawing Sheets

(51) Int. Cl.
*G06F 3/044* (2006.01)
*G02F 1/1343* (2006.01)

(52) U.S. Cl.
CPC ........ *G02F 1/134309* (2013.01); *G06F 3/044* (2013.01); *G06F 3/0412* (2013.01); *G02F 2001/134372* (2013.01); *G06F 2203/04111* (2013.01)

(58) Field of Classification Search
CPC ........... G06F 1/13338; G06F 1/134309; G06F 1/133345; G06F 1/133305; G06F 2001/133302; G06F 2001/133357; G06F 1/1368
See application file for complete search history.

(56) References Cited

U.S. PATENT DOCUMENTS

| | | |
|---|---|---|
| 2014/0104236 A1 | 4/2014 | Hamaguchi et al. |
| 2016/0195946 A1* | 7/2016 | Ahn ........................ G06F 3/044 345/173 |

* cited by examiner

POSITION INPUT DEVICE AND DISPLAY DEVICE HAVING POSITION INPUT FUNCTION

TECHNICAL FIELD

The present invention relates to a position input device and a display device having a position input function.

BACKGROUND ART

In recent years, a touch panel has been installed in electronic devices such as tablet-type laptop computers and portable information terminals for improving operability and usability. Position information within a plane display surface of a display panel is input via the touch panel with being touched by a finger or a touch pen. Accordingly, a user can directly operate the panel as if a user directly touches images displayed on the liquid crystal panel. An example of such a touch panel as described in following Patent Document 1 has been known.

Patent Document 1 describes a touch panel controller including a driving section for driving drive lines DL1 through DL4 on the basis of a code sequence so as to drive electrostatic capacitors C31 through C34 provided between the respective drive lines DL1 through DL4 and a sense line SL3 and electrostatic capacitors C41 through C44 provided between the respective drive lines DL1 through DL4 and a sense line SL4 so that a first linear sum of the respective electrostatic capacitors C31 through C34 is outputted and a second linear sum of the respective electrostatic capacitors C41 through C44 is outputted, a differential amplifier for amplifying a difference between the first linear sum and the second linear sum, and a saturation prevention control section for correcting a line dependency between the capacitance values of the electrostatic capacitors C31 through C34 and the second capacitance values of the electrostatic capacitors C41 through C44.

RELATED ART DOCUMENT

Patent Document

Patent Document 1: Japanese Unexamined Patent Application Publication No. 2013-3603

Problem to be Solved by the Invention

The electrostatic capacitor with respect to an end-side one of the sense lines tends to be smaller the electrostatic capacitor with respect to other ones of the sense lines that are on a middle portion. Therefore, difference between the electrostatic capacitor of the end-side sense line and that of the sense line next to the end-side sense line is relatively greater than a difference between the electrostatic capacitors of the adjacent sense lines at a middle portion. If the position is detected by obtaining difference between the adjacent sense lines as described in Patent Document 1, great noise may be caused when obtaining difference between the adjacent sense lines and position detection sensitivity may be locally deteriorated.

DISCLOSURE OF THE PRESENT INVENTION

The technology disclosed herein was made in view of the above circumstances. An object is to restrict local occurrence of deterioration of position detection sensitivity.

Means for Solving the Problem

A position input device according to the present technology includes first position detection electrodes extending in a first direction and arranged in a second direction that is perpendicular to the first direction, second position detection electrodes extending in the second direction and arranged in the first direction so as to include portions overlapping the first position detection electrodes in a plan view and, the second position detection electrodes and the first position detection electrodes producing an electrostatic capacitance therebetween, and floating electrodes arranged adjacent to the first position detection electrodes, respectively, in a plan view, and including portions overlapping the second position detection electrodes in a plan view, the floating electrodes and the first position detection electrodes adjacent thereto producing an electrostatic capacitance therebetween, and the floating electrodes and the second position detection electrodes overlapping the floating electrodes producing an electrostatic capacitance therebetween. The floating electrodes include a reference width floating electrode, a smallest width floating electrode, and an intermediate width floating electrode, the smallest width floating electrode is disposed at an end-side one of the floating electrodes with respect to the second direction and having a smallest width, and the intermediate width floating electrode is disposed closer to the end-side one than the reference width floating electrode is and closer to a middle than the smallest width floating electrode is with respect to the second direction and having a width smaller than that of the reference width floating electrode and larger than that of the smallest width floating electrode.

According to such a configuration, electrostatic capacitance is produced between the first position detection electrodes and the second position detection electrodes that overlap the first position detection electrodes. Further, electrostatic capacitance is produced between the floating electrode and the first position detection electrode adjacent to the floating electrode and between the floating electrode and the second position detection electrode overlapping the floating electrode. Therefore, the position detection sensitivity (S/N ratio) is increased. Among the first position detection electrodes arranged in the second direction, electrostatic capacitance produced between the end-side one of the first position detection electrodes in the second direction and the adjacent floating electrode is relatively small compared to electrostatic capacitance produced between the middle-side one of the first position detection electrodes and the adjacent floating electrode and the difference between the capacitance values tends to be increased. Therefore, great noise may be caused in detecting positions and the position detection sensitivity may be locally lowered. The floating electrodes includes the intermediate width floating electrode that is arranged closer to the end-side one than the reference width floating electrode is with respect to the second direction and arranged closer to the middle than the end-side smallest width floating electrode is. The intermediate width floating electrode has the width smaller than the width of the reference width floating electrode and greater than the width of the smallest floating electrode. Therefore, the capacitance values of the electrostatic capacitance produced between the first position detection electrodes arranged in the second direction and the respective floating electrodes are equalized and extreme difference of the capacitance values is less likely to be caused at the end portion in the second direction. Accordingly, the first position detection electrode is less likely to be affected by the noise at the end portion in the second direction in detecting positions. The position detection sensitivity is less likely to be lowered locally at the end portion with respect to the second direction.

The position input device of the present technology may include following configurations.

(1) Each of the first position detection electrodes may gave a same width. According to such a configuration, a total area of the floating electrodes is equal to that of the prior art configuration compared to a configuration in that a width of a first position detection electrode disposed at the end portion in the second direction is relatively large.

(2) The smallest width floating electrode may be configured to have a width that is larger than a half of a width of the intermediate width floating electrode. According to such a configuration, difference between the width of the smallest width floating electrode and the width of the intermediate floating electrode is effectively small. Therefore, difference between the capacitance values that may be caused at the end portion in the second direction is less likely to be caused.

(3) The intermediate width floating electrode may include at least two intermediate width floating electrodes having a same width and arranged to sandwich one of the first position detection electrodes therebetween. According to such a configuration, the configuration is simplified compared to a configuration including intermediate width floating electrodes having different widths.

(4) The first position detection electrodes may include a reference width first position detection electrode, a largest width first position detection electrode, and an intermediate width first position detection electrode. The largest width first position detection electrode may be disposed at an end-side one of the first position detection electrodes and has a largest width, and the intermediate width first position detection electrode may be disposed closer to the end-side one than the reference width first position detection electrode is and closer to a middle than the largest width first position detection electrode is with respect to the second direction and have a width larger than that of the reference width first position detection electrode and smaller than that of the largest width first position detection electrode. According to such a configuration, the first position detection electrodes include the intermediate width first position detection electrode that is disposed closer to the end side than the reference width first position detection electrode is and closer to the middle than the end-side largest width first position detection electrode is with respect to the second direction and has the width larger than that of the reference width first position detection electrode and smaller than that of the largest width first position detection electrode. Therefore, the capacitance values of electrostatic capacitance generated between the first position detection electrodes and the respective floating electrodes that are arranged in the second direction are optimally equalized and difference between the capacitance values at the end-side portion with respect to the second direction is less likely to be caused.

(5) The intermediate width first position detection electrode may be configured such that difference between a width of the intermediate width first position detection electrode and a width of the reference width first position detection electrode is equal to difference between the width of the intermediate width first position detection electrode and a width of the largest width first position detection electrode. According to such a configuration, the width of the intermediate width first position detection electrode is an average value of the width of the reference width first position detection electrode and the width1 of the largest width first position detection electrode. Therefore, the capacitance values of the electrostatic capacitance produced between each of the first position detection electrodes and each of the floating electrodes that are arranged in the second direction are further optimally equalized and difference between the capacitance values is less likely to be caused at the end portion with respect to the second direction.

(6) The intermediate width floating electrode may include at least two intermediate width floating electrodes having different widths and the at least two intermediate floating electrodes may be arranged to sandwich the first position detection electrode. According to such a configuration, difference between the capacitance values that may be caused between the first position detection electrode sandwiched between the two intermediate width floating electrodes having different widths and the first position detection electrode adjacent to the smallest width floating electrode can be optimally reduced compared to a configuration including two intermediate width floating electrodes having the same width.

Next, to solve the above problems, a display device having a position input function according to the present technology may include the above position input device, and a display panel including the position input device.

According to such a display device having a position input function and including the liquid crystal panel and the position input device, the position inputting by a user and the display on the liquid crystal panel are performed in connection with each other smoothly and feeling of use is improved.

The display device having a position input function of the present technology may include following configurations.

(1) The display panel may include an array board including at least displaying elements arranged in a display area displaying images and a counter substrate arranged opposite the array board while having a space therebetween, and the position input device may be disposed integrally with the display panel such that the second position detection electrodes are disposed in the display area and on a plate surface of the counter substrate opposite the array board and the first position detection electrodes and the floating electrodes are disposed in the display area and on a plate surface of the counter substrate that is opposite from the plate surface opposite the array board. According to such a configuration, the position input device is provided integrally with the display panel and therefore, the display device having a position input function is effectively reduced in thickness and cost compared to a configuration in that the position input device is included as a separate component from the display panel.

Advantageous Effect of the Invention

According to the present technology, local deterioration of position detection sensitivity is less likely to occur.

MODES FOR CARRYING OUT THE INVENTION

First Embodiment

A first embodiment will be described with reference to FIGS. 1 to 13. In this embodiment, a liquid crystal display device having a position inputting function (a display device having a position inputting function) 10 will be described. X-axis, Y-axis and Z-axis may be indicated in some of the drawings. The axes in each drawing correspond to the respective axes in other drawings. A vertical direction is referred to that in FIG. 2 and an upper side and a lower side in FIG. 2 correspond to a front side and a rear side, respectively.

Figure 1:
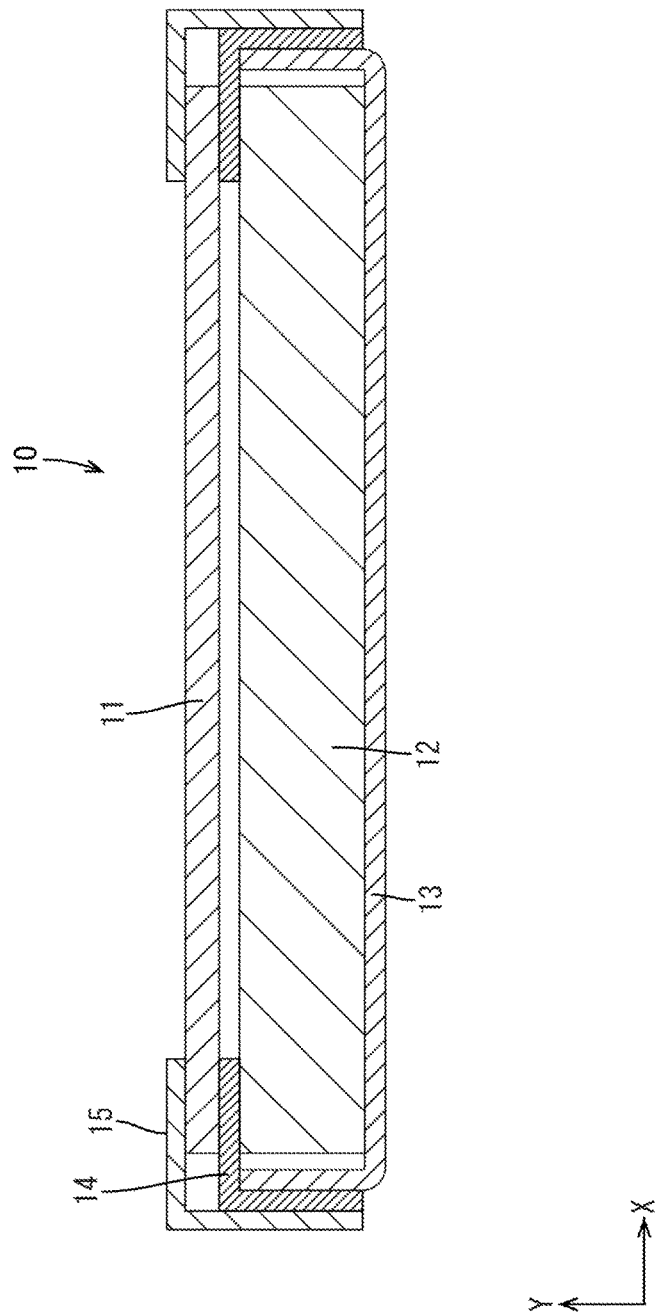
FIG. 1 is a cross-sectional view of a liquid crystal display device according to a first embodiment.
Figure 2:
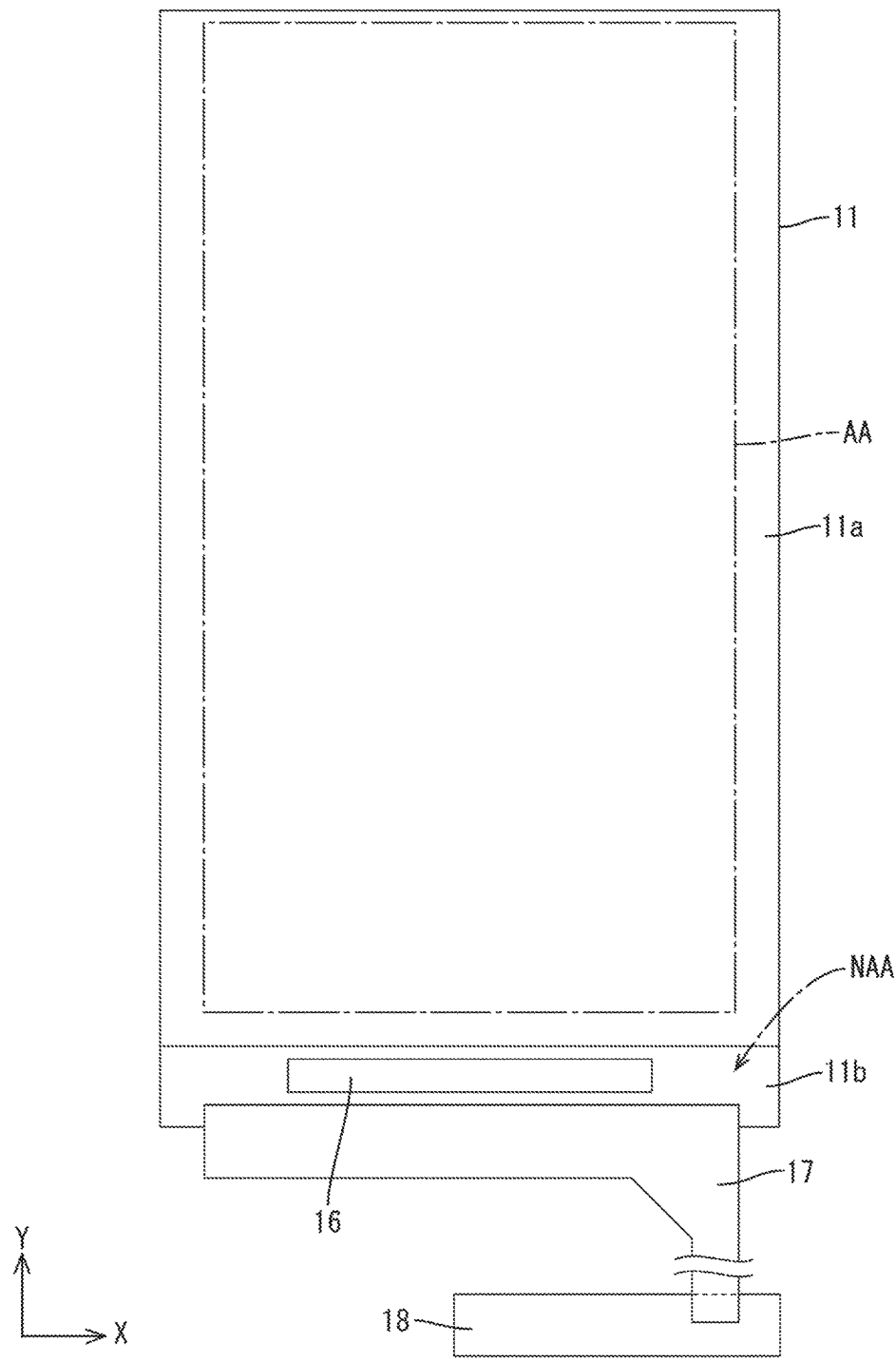
FIG. 2 is a plan view of a liquid crystal panel included in the liquid crystal display device.

As illustrated in FIGS. 1 and 2, the liquid crystal display device 10 includes a liquid crystal panel (a display panel having a position inputting function) 11 for displaying images thereon and detecting position information that is input by a user based on the displayed images, and a backlight device (a lighting device) 12 as an external light source for providing light used for displaying toward the liquid crystal panel 11. The liquid crystal display device 10 further includes a chassis 13 where the backlight device 12 is arranged, a frame 14 that holds the backlight device 12 with the chassis 13, and a bezel (a holding member) 15 that holds the liquid crystal panel 11 with the frame 14. The backlight device 12 includes at least a light source (for example, a cold cathode tube, a LED, and organic EL), and an optical member having an optical property of converting light from the light source into planar light.

The liquid crystal display device 10 according to this embodiment is used in electronic devices (not illustrated) such as mobile phones (including smart phones), laptop computers (including tablet-type laptop computers), mobile information terminals (including electronic book and PDA), a digital photo frame, and portable video game players. The display size of the liquid crystal panel 11 included in the liquid crystal display device 10 is from several inches to a dozen inches. Namely, the liquid crystal panel 11 is generally classified as a small sized or a medium sized panel.

The liquid crystal panel 11 will be described. As illustrated in FIG. 2, the liquid crystal panel 11 has a rectangular and vertically long overall shape and has a long-side direction along the Y-axis direction and a short-side direction along the X-axis direction. The liquid crystal panel 11 includes a display area (an active area) AA in which images appear and non-display area (a non-active area) NAA having a frame shape surrounding the display area AA and in which no images appear. The liquid display panel 11 includes the display area AA closer to one edge portion thereof in the long-side direction (on an upper side in FIG. 2). The non-display area NAA includes a frame-shaped area surrounding the display area AA (a frame edge portion of a CF board 11a, which will be described later), and an area (a portion of an array board 11b, which will be described later, not overlapping the CF board 11a and being uncovered) provided on another edge portion thereof in the long-side direction (on a lower side in FIG. 2). The latter area is a mount area where a driver (a panel driving portion) 16 and a flexible printed circuit board (an external connection part) 17 are mounted. The flexible printed circuit board 17 has flexibility and connects the liquid crystal panel 11 and a control circuit board 18 that is an external signal supply source and is configured to transfer signals supplied from the control circuit board 18 to the driver 16. The driver 16 is a LSI chip having a driving circuit therein and processes input signals transferred from the control circuit board 18 and generates output signals and outputs the output signals to the display area AA of the liquid crystal panel 11. A frame-shaped dot-and-dashed line that is smaller than the CF board 11a represents an outline of the display area AA and an area outside the dot-and-dashed line is the non-display area NAA.

Figure 7:
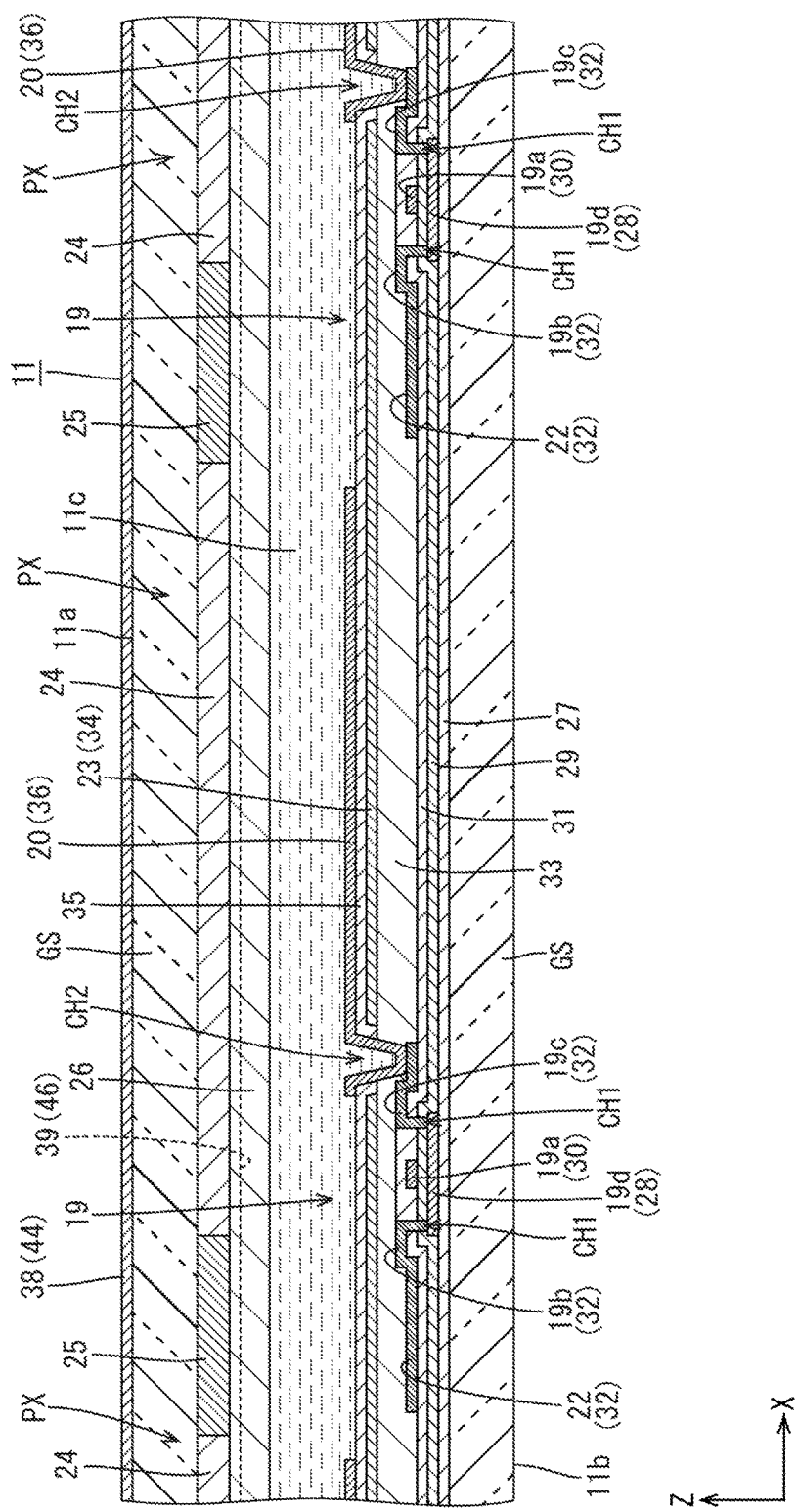
FIG. 7 is a cross-sectional view taken along line vii-vii in FIG. 6.

As illustrated in FIGS. 2 and 7, the liquid crystal panel 11 includes a pair of substrates 11a, 11b and a liquid crystal layer 11c that is between the substrates 11a and 11b. The liquid crystal layer (liquid crystals) 11c contains liquid crystal molecules, which are substances that change optical characteristics when electromagnetic field is applied. The substrates 11a, 11b are bonded together with a sealing member (not illustrated) with a gap therebetween. The gap corresponds to a thickness of the liquid crystal layer 11c. One of the substrates 11a, 11b on the front (a front-surface side) is the CF board (a counter substrate) 11a and the other one of the substrates 11a, 11b on the rear (a rear-surface side) is the array board (an element board, an active matrix board) 11b. The CF board 11a and the array board 11b are substantially transparent glass substrates GS (having high transmissivity) and are formed by layering various films on the glass substrates GS with the known photolithography method. As illustrated in FIG. 2, a short dimension of the CF board 11a is substantially the same as that of the array board 11b and a long dimension of the CF board 11a is smaller than that of the array board 11b. The CF board 11a is bonded to the array board 11b with one of edges of the short dimension of the CF board 11a (the upper edge in FIG. 2) aligned with one of edges of the array board 11b. Therefore, a portion of the array board 11b closer to the other one of the edges thereof (the lower edge in FIG. 2) does not overlap the CF board 11a, that is, front and back surfaces of the portion are uncovered. The mount area for the drivers 16 and the flexible printed circuit board 17 is allocated in this portion. Alignment films (not illustrated) for aligning liquid crystal molecules in the liquid crystal layer 11c are formed on inner surfaces of the substrates 11a, 11b, respectively to opposite the liquid crystal layer 11c. Polarizing plates are bonded to outer surfaces of the substrates 11a, 11b, respectively.

Figure 6:
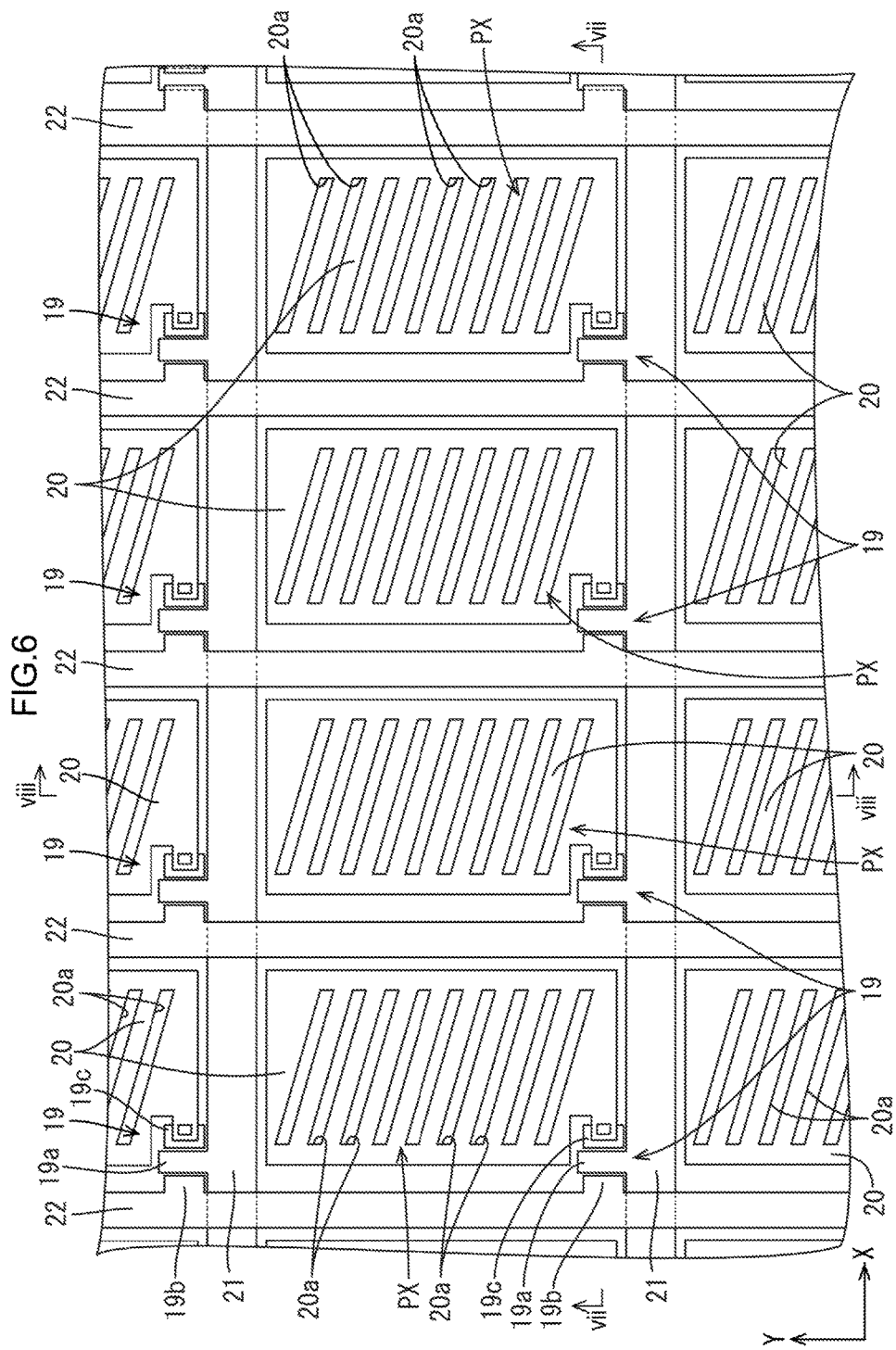
FIG. 6 is a plan view illustrating a middle portion of the array board.

Configurations of the array board 11b and the CF board 11a that are within the display area AA will be briefly described. As illustrated in FIGS. 6 and 7, a large number of thin film transistors (TFTs) 19 and a large number of pixel electrodes 20 are arranged in a matrix on the inner surface of the array board 11b (a surface facing the liquid crystal layer 11c and the CF board 11a). The TFTs 19 are switching components. Gate lines 21 and source lines 22 are arranged in a matrix around the TFTs 19 and the pixel electrodes 20. Namely, the TFTs 19 and the pixel electrodes 20 are arranged in rows and columns in a crossing area defined by the gate lines 21 and the source lines 22 crossing each other. The gate lines 21 and the source lines 22 are connected to gate electrodes 19a and source electrodes 19b of the TFTs 19, respectively. The pixel electrodes 20 are connected to drain electrodes 19c of the TFTs 19. The TFTs 19, the pixel electrodes 20, the gate lines 21, and the source lines 22 configure a part of a display circuit for displaying images. Specific configuration of the TFT 19 will be described later. The pixel electrode 20 has a vertically elongated rectangular plan view shape. A common electrode 23 is formed on the array board 11b. An electric field is produced between the common electrode 23 and the pixel electrodes 20 if a common potential (a reference potential) is supplied to the common electrode 23. The liquid crystal panel 11 of this embodiment operates in a fringe field switching (FFS) mode that is a mode improved from an in-plane switching (IPS) mode, and the pixel electrodes 20. The array board 11b is provided with the pixel electrodes 20 and the common electrode 23. The pixel electrodes 20 and the common electrode 23 are provided in different layers. The pixel electrode 20 has slits 20a each of which extends obliquely with respect to the X-axis direction and the Y-axis direction in a plan view and that are arranged at intervals. When potential difference is generated between the pixel electrodes 20 and the common electrode 23 that are provided in different layers by the slits 20a, a fringe field (an oblique field) including a component in a direction normal to a plate surface of the array board 11b is applied to the liquid crystal layer 11c in addition to a component in a direction along the plate surface of the array board 11b. Therefore, alignment of the liquid crystal molecules in the liquid crystal layer 11c can be properly switchable.

As illustrated in FIG. 7, the CF board 11a includes a color filter 24 on an inner surface thereof (facing the liquid crystal layer 11c, facing the array board 11b) and within the display area AA. The color filter 24 includes a large number of color sections colored in red (R), green (G), and blue (B). The color sections are arranged in a matrix and overlap the pixel electrodes 20 disposed on the array board 11b in a plan view. A light blocking portion (a black matrix) 25 is arranged between the color sections of the color filter 24. The light blocking portion 25 has a function for reducing color mixing. The light blocking portion 25 is disposed corresponding to the gate lines 21 and the source lines 22 in a plan view. A flattening film 26 (a protection film, an overcoat film) 26 is disposed on surfaces of the color filter 24 and the light blocking portion 25. In the liquid crystal panel 11, color sections of three colors including red (R), green (G), and blue (B) and three pixel electrodes 20 opposite the respective three color sections configure one display pixel that is a display unit. The display pixels include color pixel portions PX of three colors of red, green, and blue. Each of the color pixel portions PX includes a set of the pixel electrode 20 and the color section that is opposite the pixel electrode 20. The color pixel portions PX of three colors are arranged on a plate surface of the liquid crystal panel 11 in a row direction (the X-axis direction) sequentially in a repeated manner and configure a pixel group. Multiple pixel groups are arranged in the column direction (the Y-axis direction). The light blocking portion 25 is disposed to divide the adjacent color pixel portions PX.

Next, a specific layering order of the films that are arranged on the inner surface of the array board 11b with a known photolithography method will be described. Components for a function of displaying images (displaying function) among functions of the liquid crystal panel 11 are mainly included in the array board 11b. Specifically, as illustrated in FIG. 7, on the array board 11b, the following films are formed in the following sequence from the lowest layer (the grass substrate GS side, a rear side): a basecoat film 27, a semiconductor film 28, a gate insulator (an inorganic insulator) 29, a first metal film (gate metal film) 30, a first interlayer insulator (an inorganic insulator) 31, a second metal film (source metal film) 32, a flattening film (an organic insulator) 33, a first transparent electrode film 34, a second interlayer insulator (an inorganic insulator) 35, and a second transparent electrode film 36. The alignment films are formed on an upper layer side of the second interlayer insulator 35 and the second transparent electrode film 36.

The basecoat film 27 is a solid pattern covering an entire surface of the glass substrate GS to be the array board 11b, and is made of silicon oxide ($SiO_2$), silicon nitride ($SiNx$), or silicon nitrided oxide (SiON). The semiconductor film 28 is disposed on an upper layer side of the basecoat film 27 and formed with patterning in the display area AA and the non-display area NAA. The semiconductor film 28 is formed with patterning in an island form according to the arrangement of the TFTs 19 in at least the display area AA. The semiconductor film 28 is made of a continuous grain (CG) silicon thin film that is a kind of a polycrystallized silicon film (a polycrystalline silicone film). The CG silicon film is formed as follows. Metal material is added to an amorphous silicon thin film and the additive is subjected to a heating process at a low temperature of 550° C. or lower for a short time. Accordingly, atomic arrangement at a crystal grain boundary of the silicon crystals has continuity. The gate insulator 29 is arranged on an upper layer side of the basecoat film 27 and the semiconductor film 28 and formed in a solid pattern disposed in an area extending the display area AA and the non-display area NAA. For example, the gate insulator 29 is made of $SiO_2$.

The first metal film 30 is arranged on an upper layer side of the gate insulator 29 and disposed in each of the display area AA and the non-display area NAA with patterning. The first metal film 30 is a multilayer film of titanium (Ti) and copper (Cu). The gate lines 21 and the gate electrodes 19a are formed of the first metal film 30. The first interlayer insulator 31 is arranged on an upper layer side of the gate insulator 29 and the first metal film 30 and is formed in a solid pattern disposed in an area extending the display area AA and the non-display area NAA. The first interlayer insulator 31 is made of silicon oxide ($SiO_2$). The insulation between the crossing portions of the gate lines 21 and the source lines 22 is maintained by the first interlayer insulator 31. The second metal film 32 is arranged on an upper layer side of the first interlayer insulator 31 and is disposed in each of the display area AA and the non-display area NAA with patterning. The second metal film 32 is a multilayer film that includes titanium (Ti) and copper (Cu). The source lines 22, the source electrodes 19b, and the drain electrodes 19c are formed of the second metal film 32. The flattening film 33 is arranged on an upper layer side of the first interlayer insulator 31 and the second metal film 32 and is formed in a solid pattern disposed in an area extending the display area AA and the non-display area NAA. The flattening film 33 is made of acrylic resin such as polymethyl methacrylate (PMMA). The flattening film 33 has a film thickness relatively greater than those of the insulators 29, 31, 35 that are inorganic insulators. Therefore, the surface of the array board 11b facing the liquid crystal layer 11c (on which the alignment film is disposed) can be effectively flattened by the flattening film 33.

The first transparent electrode film 34 is arranged on an upper layer side of the flattening film 33 and formed in a substantially solid pattern that is disposed at least in the display area AA. The first transparent electrode film 34 is made of a transparent electrode material such as indium tin oxide (ITO) or zinc oxide (ZnO). The common electrode 23 that is formed in a substantially solid pattern are formed of the first transparent electrode film 34. The second interlayer insulator 35 is arranged on an upper layer side of the flattening film 33 and the first transparent electrode film 34 and formed in a solid pattern extending the display area AA and the non-display area. The second interlayer insulator 35 is made of silicon nitride ($SiN_x$). The second transparent electrode film 36 is arranged on an upper layer side of the second interlayer insulator 35 and formed in an island form with patterning according to the arrangement of the TFTs 19 in the display area AA. The second transparent electrode film 36 is made of a transparent electrode material such as indium tin oxide (ITO) or zinc oxide (ZnO). The pixel electrodes 20 are formed of the second transparent electrode film 36. The gate insulator 29, the first interlayer insulator 31, the flattening film 33, and the second interlayer insulator 35 are formed with patterning in the process of producing the array board 11b such that holes such as contact holes CH1, CH2 are formed in corresponding certain positions.

The TFT 19 disposed in the display area AA of the array board 11b is a so-called top-gate type (a staggered type) TFT. As illustrated in FIG. 7, such a TFT 19 includes a channel portion 19d formed of the semiconductor film 28, the gate electrode 19a, the source electrode 19b, and the drain electrode 19c. The gate electrode 19a is disposed to overlap the channel portion 19d while having the gate insulator 29 therebetween. The gate electrode 19a is on an upper layer side of the channel portion 19d. The source electrode 19b and the drain electrode 19c are disposed on an upper layer side of the gate electrode 19a via the first interlayer insulator 31. Among them, the source electrode 19b and the drain electrode 19c are connected to the channel portion 19d through the contact hole CH1 that is formed in the gate insulator 29 and the first interlayer insulator 31. Accordingly, electrons move between the source electrode 19b and the drain electrode 19c. The semiconductor film 28 of the channel portion 19d is made of the CG silicon thin film, as described before. The CG silicon thin film has electron mobility of 200 to 300 $cm^2/Vs$, for example, that is higher than that of an amorphous silicon film. The TFT 19 including the semiconductor film 28 made of the CG silicon thin film as the channel portion 19d can be easily downsized and an amount of transmitted light through each pixel electrode 20 can be increased to a maximum level. This configuration is preferable for enhancement of image resolution and reduction of power consumption. The pixel electrode 20 formed of the second transparent electrode film 26 is connected to the drain electrode 19c of the TFT 19 through the contact hole CH2 formed in the flattening film 33 and the second interlayer insulator 35. Accordingly, if power is supplied to the gate electrode 19a of the TFT 19, current flows between the source electrode 19b and the drain electrode 19c via the channel portion 19d and a certain potential is applied to the pixel electrode 20. The common electrode 23 formed of the first transparent electrode film 34 overlaps the pixel electrodes 20 in a plan view and the common electrode 23 and the pixels 20 sandwich the second insulator 35 therebetween. The common electrode 23 that is disposed in a solid pattern has holes in portions overlapping the respective contact holes CH2 of the flattening film 33 and the second interlayer insulator 35. The contact portions of the pixel electrodes 20 pass through the holes of the common electrode 23.

Figure 3:
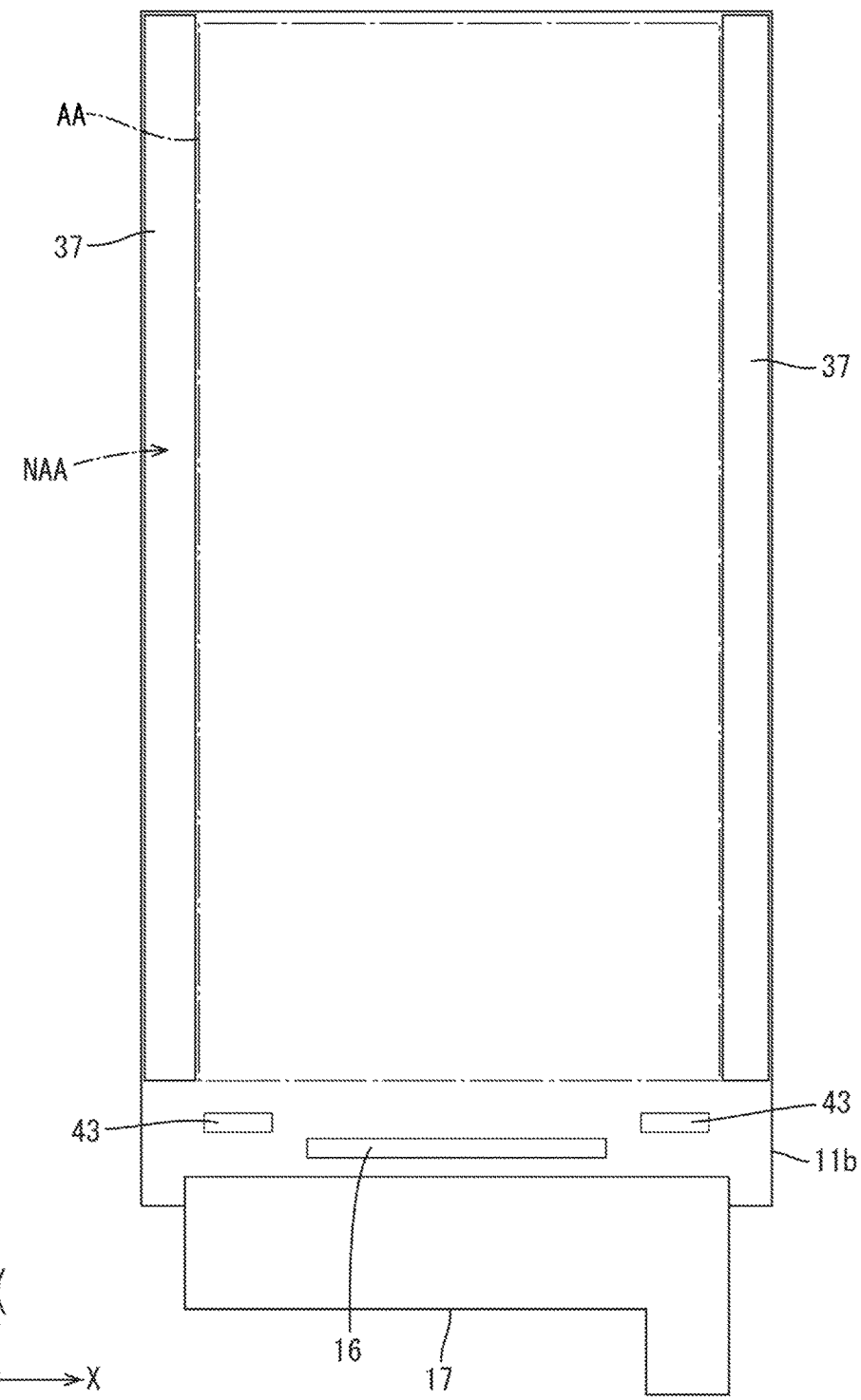
FIG. 3 is a plan view of an array board included in the liquid crystal panel.

Next, configurations of components in the non-display area NAA of the array board 11b will be described. As illustrated in FIG. 3, in portions of the non-display area NAA of the array board 11b next to the display area AA with respect to the X-axis direction (the short-side direction of the liquid crystal panel 11), monolithic circuit portions (component driving portions) 37 are disposed. The monolithic circuit portions 37 and TFTs 19 are included in a display circuit. A pair of the monolithic circuit portions 37 sandwiches the display area AA with respect to the X-axis direction and extends over substantially whole length of the display area AA along the Y-axis direction. The monolithic circuit portion 37 is formed on the array board 11b in a monolithic form and includes the semiconductor film 28 that is the same as the TFTs 19 in the display area AA as a base. Accordingly, the monolithic circuit portion 37 includes a control circuit and a circuit component for controlling supply of the output signals to the TFTs 19. The circuit component of the control circuit includes a circuit TFT (thin film transistor for circuit) using the semiconductor film 28 as the channel portion. The control circuit includes a circuit tracing portion (not illustrated) including the first metal film 30 and the second metal film 32. The monolithic circuit portion 37 includes a scanning circuit that is configured to supply scanning signals included in the output signals from the driver 16 to each of the gate lines 21 at a predefined timing and scan the gate lines 21 sequentially. The monolithic circuit portion 37 may include an auxiliary circuit such as a level shifter circuit or an ESD protection circuit. The monolithic circuit portions 37 are connected to the driver 16 via connection lines (not illustrated) formed on the array board 11b.

Figure 4:
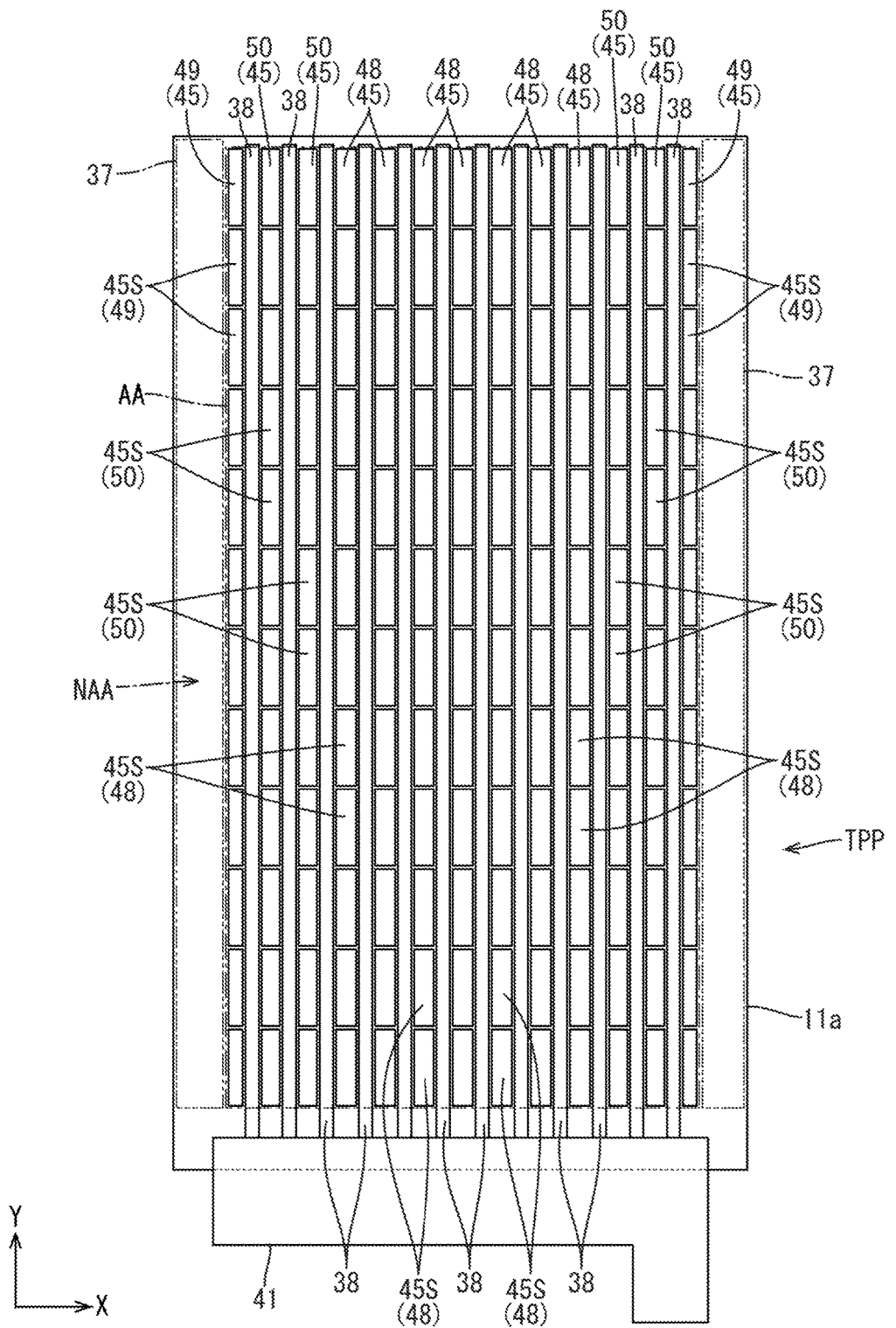
FIG. 4 is a plan view of a CF board included in the liquid crystal panel.
Figure 5:
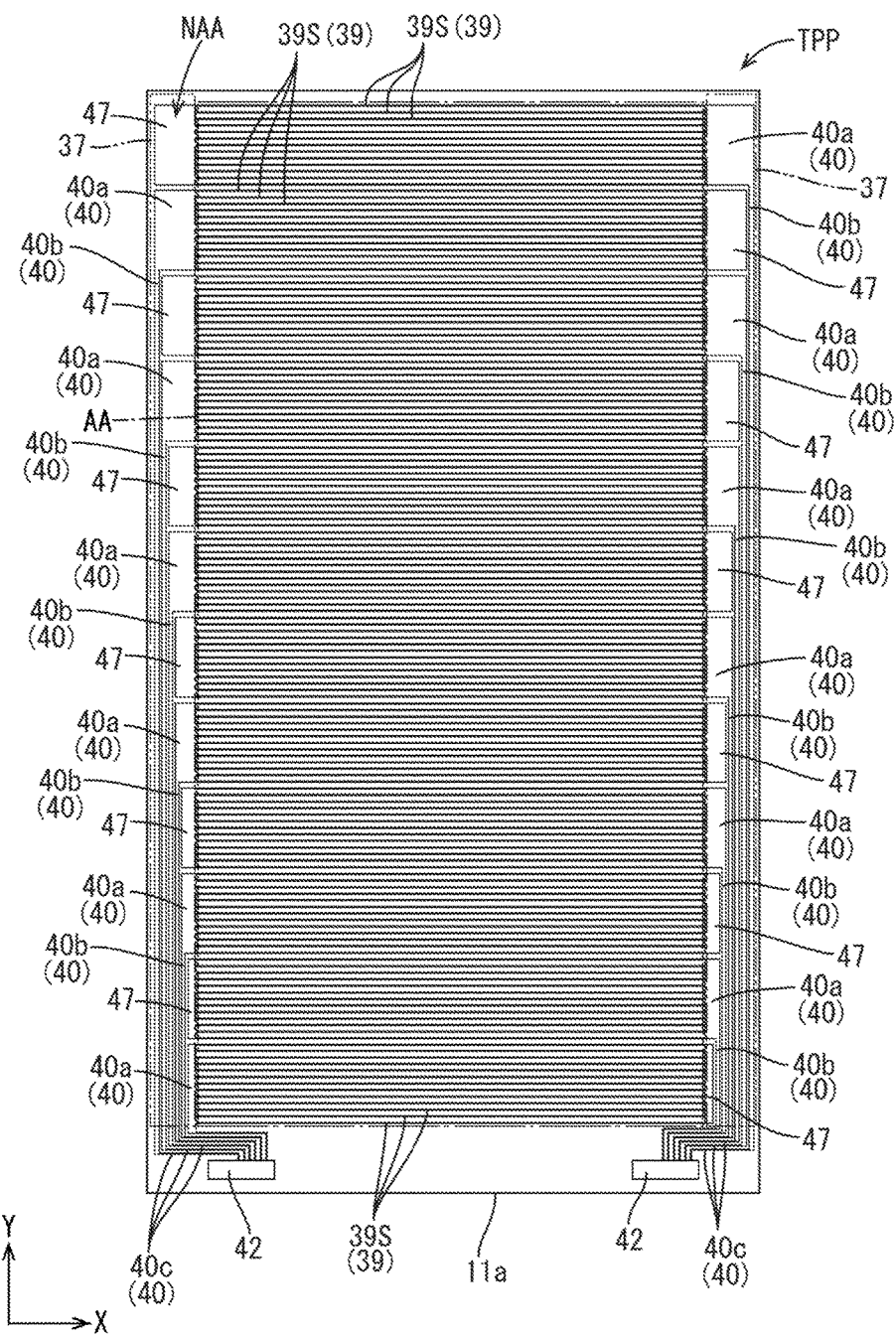
FIG. 5 is a bottom view of the CF board included in the liquid crystal panel.

As described before, the liquid crystal panel 11 according to this embodiment has a displaying function of displaying images and a position inputting function of detecting position information input by a user based on the displayed images. The liquid crystal panel 11 includes an in-cell touch panel pattern (a position input device) TPP for the position inputting function. The touch panel pattern TPP is a so-called projected capacitive touch panel pattern and a detection method of a mutual capacitive type is used. The touch panel pattern TPP is disposed on the CF board 11a. Specifically, as illustrated in FIGS. 4 and 5, the touch panel pattern TPP includes at least detection electrodes (a first position detection electrode, a receiving electrode) 38 disposed on an outer surface side (an opposite side from the liquid crystal layer 11c side, the front side, the display surface side) of the CF board 11a and driving electrodes (a second position detection electrode, a transmitting electrode) 39 disposed on an inner surface side (the liquid crystal layer 11c side, the rear side, an opposite side from the display surface side) of the CF board 11a. With such a touch panel pattern TPP, a position inputting operation (a touch operation) can be detected by a change in electrostatic capacitance caused by an object (such as a user's finger) that may block an electric field generated between the detection electrode 38 and the driving electrode 39. The detection electrodes 38 and the driving electrodes 29 included in the touch panel pattern TPP are arranged in the display area AA of the CF board 11a. Therefore, the display area AA of the liquid crystal panel 11 substantially corresponds to a touch area where the input position can be detected and the non-display area NAA substantially corresponds to a non-touch area where the input position cannot be detected. Position detection line portions 40 for supplying signals to the driving electrodes 39 connected to each of the position detection line portions 40 are arranged in the non-touch area (the non-display area NAA) on the inner surface of the CF board 11a and on two edge portions of the CF board 11a with respect to the short-side direction (the X-axis direction).

A touch panel flexible printed circuit board 41 for transmitting signals between a touch panel controller (not illustrated) and the detection electrodes 38 is connected to an outer surface of an one edge portion of the CF board 11a (a lower edge portion in FIGS. 4 and 5) in the non-touch area with respect to the long-side direction (the Y-axis direction). The touch panel flexible printed circuit board 41 substantially overlaps in a plan view the display flexible printed circuit board 17 that is connected to the liquid crystal panel 11. A pair of CF board side contact portions (a signal supply portion, a counter substrate side signal supply portion) 42 are arranged on a portion of the non-touch area of the inner surface of the CF board 11a overlapping the touch panel flexible printed circuit board 41. The CF board side contact portions 42 are connected to the position detection line portions 40 at end portions of the position detection line portions 40 opposite from the end portions connected to the driving electrodes. A pair of array board side contact portions (a component board side signal supply portion) 43 are arranged on a portion of the non-display area NAA of the inner surface of the array board 11b overlapping the respective CF board side contact portions 42. The array board side contact portions 43 are electrically connected to the respective CF board side contact portions 42. The array board side contact portions 43 are connected to the driver 16 via connection lines (not illustrated) formed on the inner surface of the array board 11b. The signals from the touch panel controller (not illustrated) are transmitted to the driving electrodes 39 through the flexible printed circuit board 17, the driver 16, the array board side contact portions 43, the CF board side contact portions 42, and the position detection line portions 40 sequentially. The CF board side contact portions 42 and the array board side contact portions 43 overlap sealing portions (not illustrated) for sealing the liquid crystal layer 11c in a plan view. The CF board side contact portions 42 and the array board side contact portions 43 are electrically connected to each other through conductive particles contained in the sealing portions.

Figure 9:
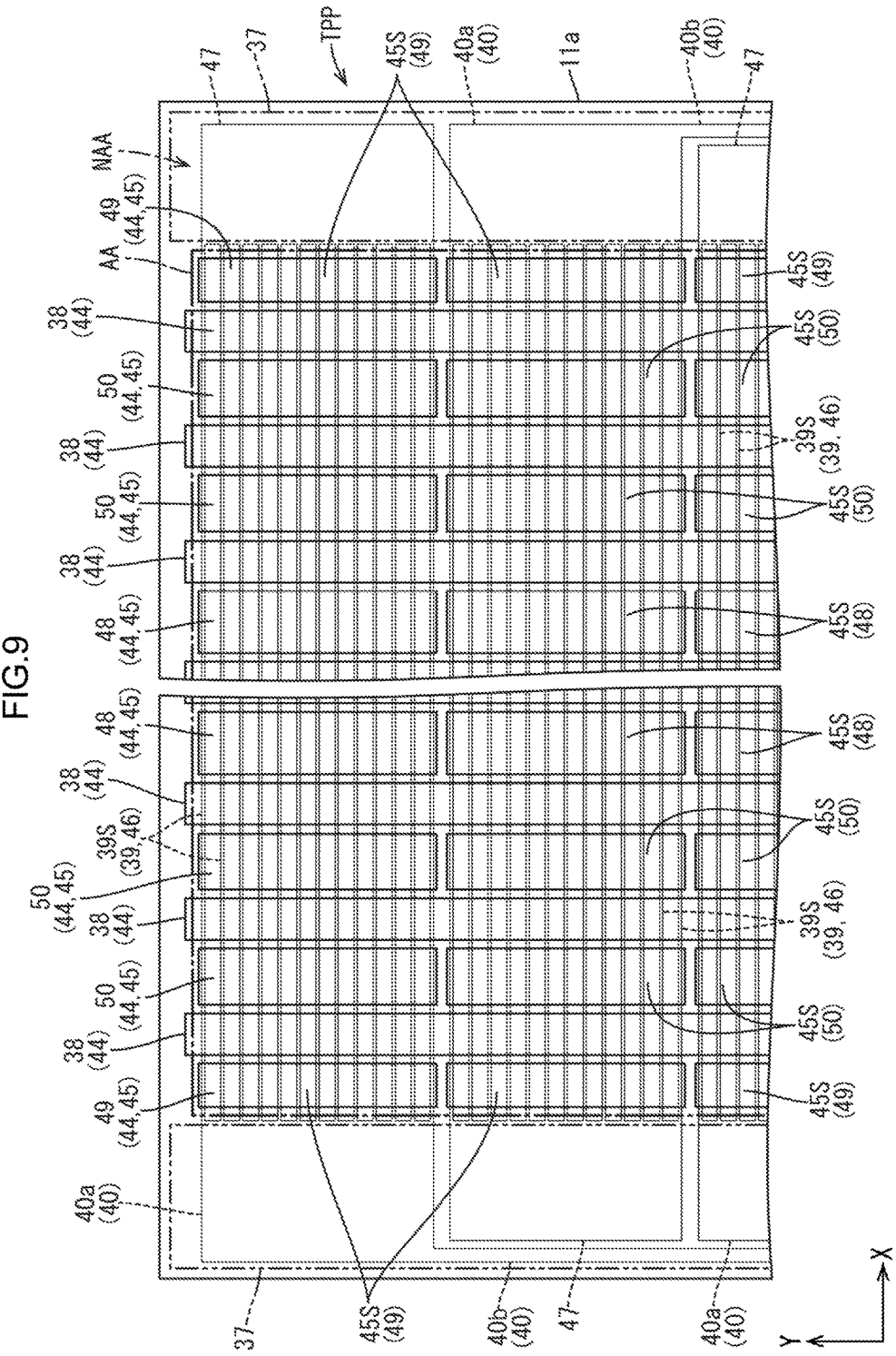
FIG. 9 is a plan view illustrating edge-side portions of the CF board with respect to a short-side direction.

As illustrated in FIGS. 4 and 9, each of the detection electrodes 38 is disposed in the display area AA on the outer surface of the CF board 11a and extends in the long-side direction or the Y-axis direction (a first direction) and has a vertically elongated plan view rectangular shape. The detection electrodes 38 are formed of the transparent electrode film 44 made of transparent electrode material such as indium tin oxide (ITO) and zinc oxide (ZnO) similarly to the pixel electrodes 20 and the common electrode 23. Therefore, the detection electrodes 38 that are arranged in the display area AA of the CF board 11a are less likely to be recognized by a user. Each of the detection electrodes 38 is longer than a floating electrode 45, which will be described later, and longer than a long-side dimension of the display area AA. One end portion (a lower end portion in FIG. 4) of the detection electrode is in the non-display area NAA and connected to the touch panel flexible printed circuit board 41. Each of the detection electrodes 38 has a width dimension greater than an X-axis dimension of the display pixel (the color pixel portion PX) and the width dimension of the detection electrode 38 covers multiple display pixels (the color pixel portions PX) (see FIG. 7). Specifically, the width dimension of the detection electrode is approximately several millimeters (for example, approximately 2 mm) and is much greater than the X-axis dimension of the display pixel (the color pixel portion PX) that is several hundred μm.

As illustrated in FIGS. 4 and 9, the detection electrodes 38 are arranged at intervals in the short-side direction or the X-axis direction (a second direction, an arrangement direction in which the detection electrodes 38 are arranged) in the display area AA on the outer surface of the CF board 11a. Floating electrodes 45 are disposed in the display area AA on the outer surface of the CF board 11a and adjacent to the respective detection electrodes 38 with respect to the X-axis direction in a plan view. Some of the floating electrodes 45 are sandwiched between the adjacent detection electrodes 38 in the X-axis direction and some of them are at an end side and next to the detection electrode 38 that is at an end of a row of the detection electrodes with respect to the X-axis direction. Each of the floating electrodes 45 is separated from each of the detection electrodes 33 physically and electrically and disposed in a form of a floating island. Electrostatic capacitance is produced between the floating electrode 45 and at least the adjacent detection electrode 38 that is adjacent to the floating electrode 45 in the X-axis direction. Some of the floating electrodes 45 each of which is sandwiched by the adjacent detection electrodes 38 in the X-axis direction produce electrostatic capacitance with the respective two adjacent detection electrodes 38 in the X-axis direction. One of the floating electrodes 45 positioned at the end in the X-axis direction produces electrostatic capacitance with one of the detection electrodes 38 at the end in the X-axis direction. With such floating electrodes 45, the capacitance value of the detection electrodes 33 is increased and it is preferable for improving position detection sensitivity (a S/N ratio). Each of the floating electrodes 45 overlaps the driving electrodes 39 in a plan view and electrostatic capacitance is produced between the floating electrode 45 and the driving electrodes 39 that overlap each other. The floating electrodes 45 are formed of the transparent electrode film 44 similarly to the detection electrodes 38 and disposed in a same layer as the detection electrodes 38 on the outer surface of the CF board 11a. Namely, in forming the floating electrodes 45 and the detection electrodes 38, after the transparent electrode film 44 is disposed on the outer surface of the CF board 11a in a solid pattern, the floating electrodes 45 and the detection electrodes 38 that are electrically independent from each other are formed by pattering the transparent electrode film 44. With such floating electrodes 45, the portions of the CF board 11a between the adjacent detection electrodes 38 have transmittance same as that of the portions on which the detection electrodes 38 area arranged. Therefore, the detection electrodes 38 are less likely to be recognized by a user.

As illustrated in FIG. 9, each of the floating electrodes 45 that are adjacent to the detection electrodes 38 in the X-axis direction includes separate floating electrodes (a separate first floating electrode) 45S such that each of the separate floating electrodes 45S overlaps the driving electrodes 39. The floating electrode 45 includes the separate floating electrodes 45S in the Y-axis direction. The separate floating electrode 45S has a vertically elongated plan view rectangular shape and has a long-side dimension (a dimension in the Y-axis direction) that is smaller than the long-side dimension of the detection electrode 38 and substantially equal to a width dimension of the driving electrode 39, which will be descried later. The separate floating electrodes 45S overlap the respective driving electrodes 39 arranged in the Y-axis direction in a plan view. According to such a configuration, electrostatic capacity is produced between one of the separate floating electrodes 45S and overlapping one of the driving electrodes 39 and is less likely to be affected by potentials of other driving electrodes 39 that do not overlap the one separate floating electrode 45S. The number of the separate floating electrodes 45S included in one floating electrode 45 (the separation number of the floating electrode 45) is same as the number of the driving electrodes 39 arranged in the Y-axis direction.

Figure 10:
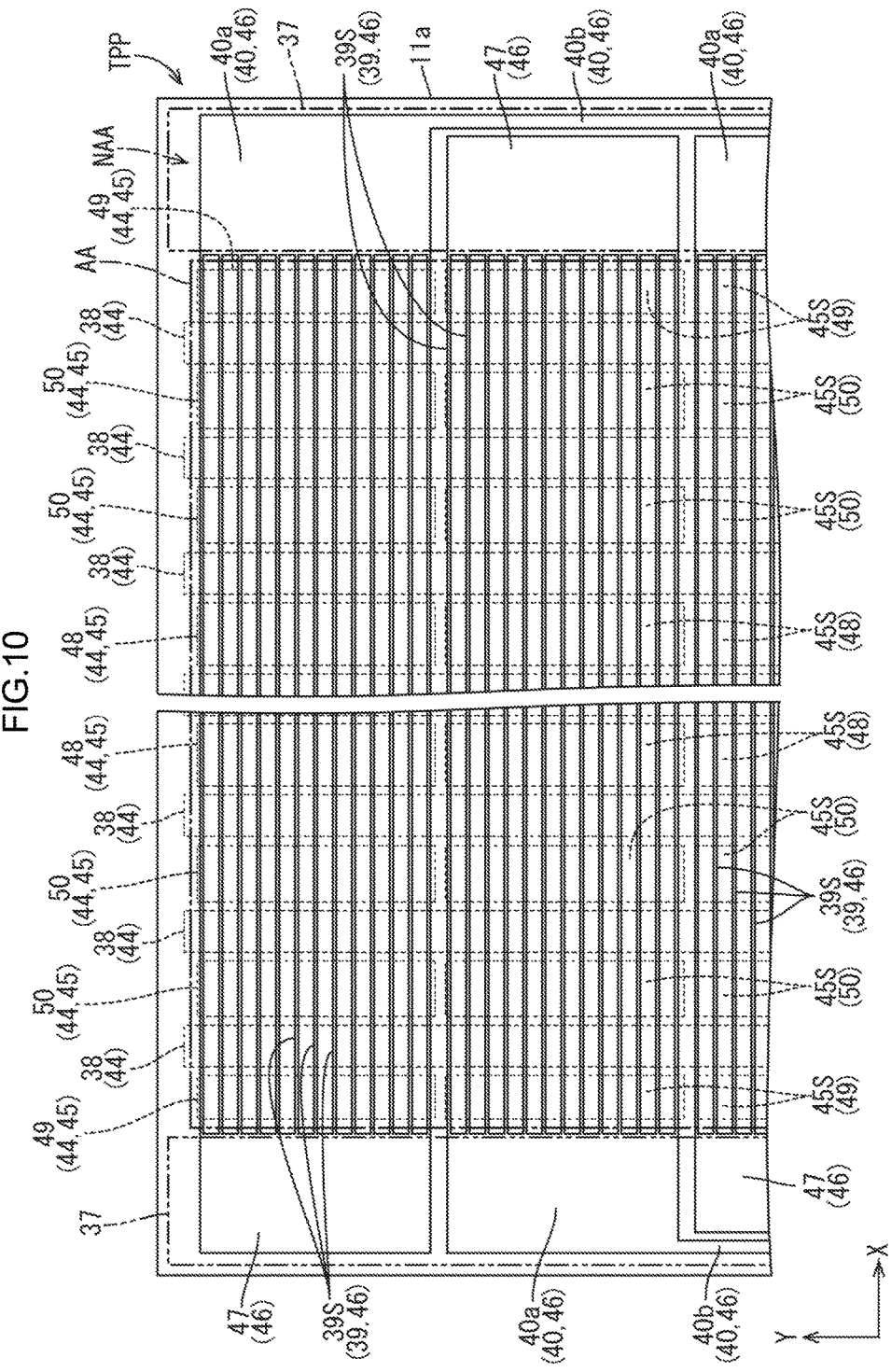
FIG. 10 is a bottom view illustrating edge-side portions of the CF board with respect to the short-side direction, the edge side portions are on an edge portion opposite from a terminal-side edge portion of the CF board with respect to a long-side direction.

As illustrated in FIGS. 5 and 10, the driving electrodes 39 are disposed in the display area AA of the inner surface of the CF board 11a and extend in the X-axis direction (a second direction) that is perpendicular to the Y-axis direction (the first direction) that is an extending direction in which the detection electrodes 38 extend. Each of the driving electrodes 39 has a length dimension that is same as the short-side dimension of the display area AA and has a width dimension greater than that of the detection electrode 38. The driving electrodes 39 are arranged in the Y-axis direction (the first direction, an arrangement direction in which the driving electrodes 39 are arranged) that is perpendicular to the extending direction of the driving electrodes 39. The driving electrodes 39 are arranged on the inner surface of the CF board 11a in the display area AA. The intervals between the adjacent driving electrodes 39 in the Y-axis direction are equal to each other and the driving electrodes 39 are arranged at equal intervals. The driving electrode 39 crosses the detection electrode 38 and the floating electrode 45 in a plan view and crossing portions are opposite each other while having the glass substrate GS of the CF board 11a therebetween and electrostatic capacitance is produced therebetween. The driving electrodes 39 are formed of the metal film 46 having higher conductivity than the transparent electrode film 44 of the detection electrodes 38 and the floating electrodes 45 and therefore, tracing resistance may be lowered. The metal film 46 of the driving electrodes 39 is made of metal material such as aluminum, molybdenum, titanium, tungsten, copper, silver, and gold. The CF board side contact portions 42 are formed of the metal film 46 of the driving electrodes 39.

Figure 8:
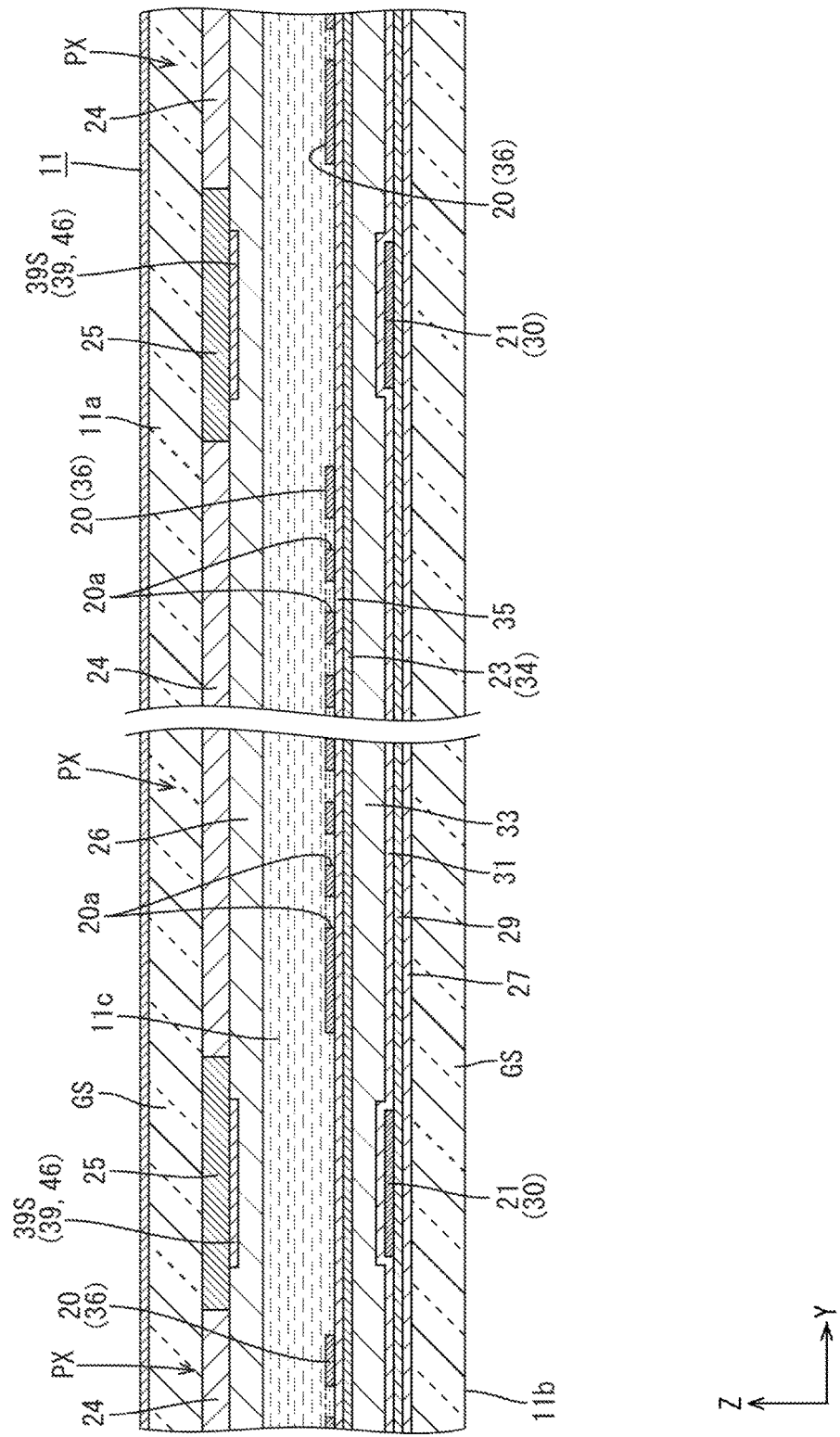
FIG. 8 is a cross-sectional view taken along line viii-viii in FIG. 6.
Figure 12:
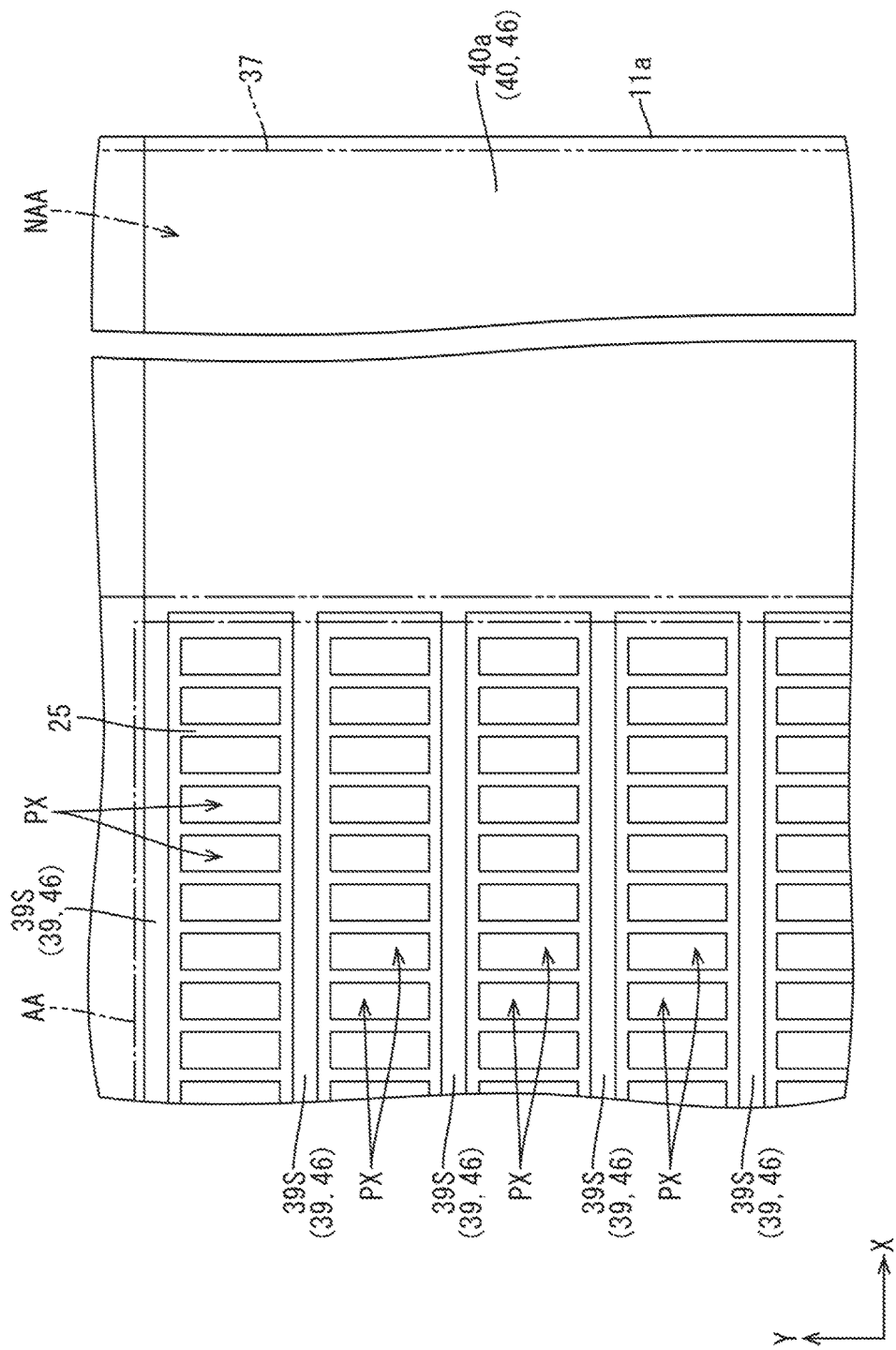
FIG. 12 is a bottom view illustrating the edge-side portion of the CF board with respect to the short-side direction, the edge side portion is on the edge portion opposite from the terminal-side edge portion of the CF board with respect to a long-side direction.

The film 46 of the driving electrodes 39 is excellent in conductivity but has substantially no transmissivity. Therefore, the driving electrodes 39 disposed in the display area AA of the CF board 11a may be seen by a user. As illustrated in FIGS. 8 and 12, the driving electrode 39 includes separate driving electrodes (separate second position detection electrode, a unit driving electrode, a branched driving electrode) 39S and the separate driving electrodes 39s overlap a part of the light blocking portion 25 of the CF board 11a in a plan view. The separate driving electrodes 39S of the driving electrode 39 extend in the X-axis direction (the second direction) and overlap portions of the light blocking portion 25 extending in the x-axis direction and arranged on an upper layer side (an array board 11b side, the liquid crystal layer 11c side, an opposite side from the glass substrate GS side) of the light blocking portion 25. As described before, the driving electrodes 39 are behind the light blocking portion 25 in a viewpoint from a user and therefore, external light is less likely to reflect off the driving electrodes 39 and the driving electrodes 39 are less likely to be seen by a user. The separate driving electrodes 39S are arranged at intervals in the Y-axis direction (the first direction) and the interval is substantially equal to a distance between the adjacent gate lines 21 in the Y-axis direction (an arrangement pitch of the color pixel portions PX in the Y-axis direction, a length dimension of the pixel electrode 20). The separate driving electrodes 39S overlap the gate lines 21 in a plan view. Each of the separate driving electrodes 39S of the driving electrode 39 has a width smaller than a width of the portion of the light blocking portion 25 extending in the X-axis direction. Therefore, during a process of producing the CF boards 11a, if positions of the light blocking portion 25 or the driving electrodes 39 are displaced relatively from correct positions in forming them with patterning, the separate driving electrodes 29S are likely to overlap the light blocking portion 25. The separate driving electrode 39S has a width dimension smaller than that of the detection electrode 38.

As illustrated in FIGS. 5 and 10, the position detection line portions 40 are arranged in the non-display area NAA of the inner surface of the CF board 11a. One end portion of the position detection line portion 40 is connected to one end portion of the driving electrode 39 and another end portion of the position detection line portion 40 extends to be connected to the CF board side contact portion 42. Most part of the position detection line portion 40 extends in the Y-axis direction (the first direction) that is perpendicular to the extending direction of the driving electrode 39. Specifically, the position detection line portions 40 include a first line portion 40A, a second line portion 40b, and a third line portion 40c. The first line portion 40A is connected to the one end portion of the driving electrode 39. The second line portion 40b extends in the Y-axis direction from the first line portion 40a. The third line portion 40c extends from the second line portion 40b to the CF board side contact portion 42 and has a bent plan view shape. The position detection line portions 40 have width dimensions that are reduced step by step as they are closer to the CF board side contact portion 42 from the driving electrode 39. The first line portion 40a has a width dimension substantially equal to that of the driving electrode 39. The second line portion 40b has a width dimension smaller than that of the first line portion 40a, and the third line portion 40c has a width dimension smaller than that of the second line portion 40b. The position detection line portion 40 has an extending distance from the driving electrode 39 to be connected to the CF board side contact portion 42. Therefore, the position detection line portion 40 connected to the driving electrode 39 that is relatively close to the CF board side contact portion 42 has a relatively short extending distance and the position detection line portion 40 connected to the driving electrode 39 that is relatively far from the CF board side contact portion 42 has a relatively long extending distance.

The position detection line portions 40 are formed of the metal film 46 similarly to the driving electrode 39 and are disposed in the same layer as the driving electrodes 39 on the inner surface of the CF board 11a. The position detection line portions 40 are formed of the metal film 46 and therefore have effectively low tracing resistance and therefore, delay is less likely to be caused in the signals transferred to the driving electrodes 39. The position detection line portions 40 that are formed of the metal film 46 have quite low transmissivity and arranged in the non-display area NAA of the CF board 11*a*. Therefore, the position detection line portions 40 are less likely to adversely affect display quality.

As illustrated in FIGS. 5 and 10, the position detection line portions 40 are arranged to sandwich the driving electrodes 39 from two sides with respect to the extending direction of the driving electrodes 39. Namely, the position detection line portions 40 are arranged in the non-display areas NAA (the non-touch area) sandwiching the display area AA (the touch area) with respect to the X-axis direction. The position detection line portions 40 overlap each of the monolithic circuit portions, in a plan view, 37 that are arranged in the non-display area NAA of the array board 11*b*. Accordingly, even if noise is caused from the monolithic circuit portion 37, the noise can be blocked by the position detection line portions 40. Therefore, the position detection properties of the touch panel pattern TPP are less likely to be deteriorated. Among the position detection line portions 40, one position detection line portions 40 overlapping one of the monolithic circuit portion 37 (for example, a right side one in FIG. 5) are connected to one end portion of the driving electrode 39 with respect to the extending direction thereof, and another position detection line portions 40 overlapping another one of the monolithic circuit portion 37 (for example, a left side one in FIG. 5) are connected to another end portion of the driving electrode 39 with respect to the extending direction thereof. The driving electrodes 39 arranged in the Y-axis direction include one driving electrodes 39 whose one end portions are connected to the one position detection line portions 40 and another driving electrodes 39 whose another end portions are connected to the other position detection line portions 40. The one driving electrodes 39 and the other driving electrodes 39 are arranged alternately in the Y-axis direction. More specifically, odd-numbered driving electrodes 39 from the CF board side contact portion 42 in the Y-axis direction are connected to the other position detection line portions 40 and even-numbered driving electrodes 39 from the CF board side contact portion 42 are connected to the one position detection line portions 40.

As illustrated in FIGS. 5 and 10, dummy line portions 47 are disposed in the non-display area on the inner surface of the CF board 11*a*. The dummy line portions 47 are disposed adjacent to end portions of the driving electrodes 39 on opposite side from the end portions that are connected to the position detection line portions 40 with respect to the X-axis direction. Each of the dummy line portions 47 has a Y-axis dimension that is substantially equal to the width of the driving electrode 39 (a Y-axis dimension) and each dummy line portion 47 is disposed corresponding to each of the driving electrodes 39 arranged in the X-axis direction. Specifically, the dummy line portions 47 includes ones that are disposed adjacent to the other end portions of the respective driving electrodes 39 connected to the one position detection line portions 40 and another ones that are disposed adjacent to the one end portions of the respective driving electrodes 39 connected to the other position detection line portions 40. The dummy line portion 47 is sandwiched between the driving electrode 39 next thereto with respect to the X-axis direction and the second line portion 40*b* that is the position detection line portion 40 next thereto on a farther side form the CF board side contact portion 42 in the Y-axis direction. The dummy line portion 47 has an X-axis dimension that is smaller than a distance between the driving electrode 39 and the second line portion 40*b* that sandwich the dummy line portion 47 therebetween. Therefore, the dummy line portion 47 closer to the CF board side contact portion 42 in the Y-axis direction has an X-axis dimension smaller than that of dummy line portion 47 farther from the CF board side contact portion 42. The dummy line portions 47 are formed of the metal film 46 similarly to the driving electrodes 39 and the position detection line portions 40 and are disposed in the same layer as the driving electrodes 39 and the position detection line portions 40 on the inner surface of the CF board 11*a*. The distance between the dummy line portion 47 and the adjacent second line portion 40*b* is preferably from 3 μm to 100 μm.

The dummy line portions 47 overlap the monolithic circuit portion 37 that is disposed in the non-display area NAA of the array board 11*b* in a plan view. Specifically, the dummy line portions 47 that are disposed adjacent to the one end portions of the respective driving electrodes 39 connected to the other position detection line portions 40 overlap one of the monolithic circuit portion 37 in a plan view. The other dummy line portions 47 that are disposed adjacent to the other end portions of the respective driving electrodes 39 connected to the one position detection line portions 40 overlap another one of the monolithic circuit portion 37. The dummy line portion 47 (except for the ones farthest from the CF board side contact portions 42) is fit in a space between an opposite end portion of the driving electrode 39 on an opposite side from the end portion connected to the position detection line portion 40 and the second line portion 40*b* of the position detection line portion 40 next to the opposite end portion with respect to the X-axis direction. The dummy line portion 47 is connected to the end portion of the driving electrode 39 that is next thereto with respect to the X-axis direction, that is, the opposite end portion of the driving electrode 39 on an opposite side from the end portion connected to the position detection line portion 40. According to such a configuration, even if a noise is caused from the monolithic circuit portion 37, the noise can be blocked with high efficiency by cooperation of the position detection line portions 40 and the dummy line portions 47. Further, during the producing process, after the metal film 46 is disposed to form with patterning the driving electrodes 39, the position detection line portions 40, the CF board side contact portions 42, and the dummy line portions 47, a continuity check pad of a continuity check device is disposed on the CF board side contact portions 42 and the dummy line portions 47 and power is supplied thereto such that errors such as disconnection of the driving electrodes 39 and the position detection line portions 40 can be checked. Namely, the dummy line portions 47 can be used for continuity check of the driving electrodes 39 and the position detection line portions 40. The dummy line portions 47 do not related to the position inputting function.

Figure 11:
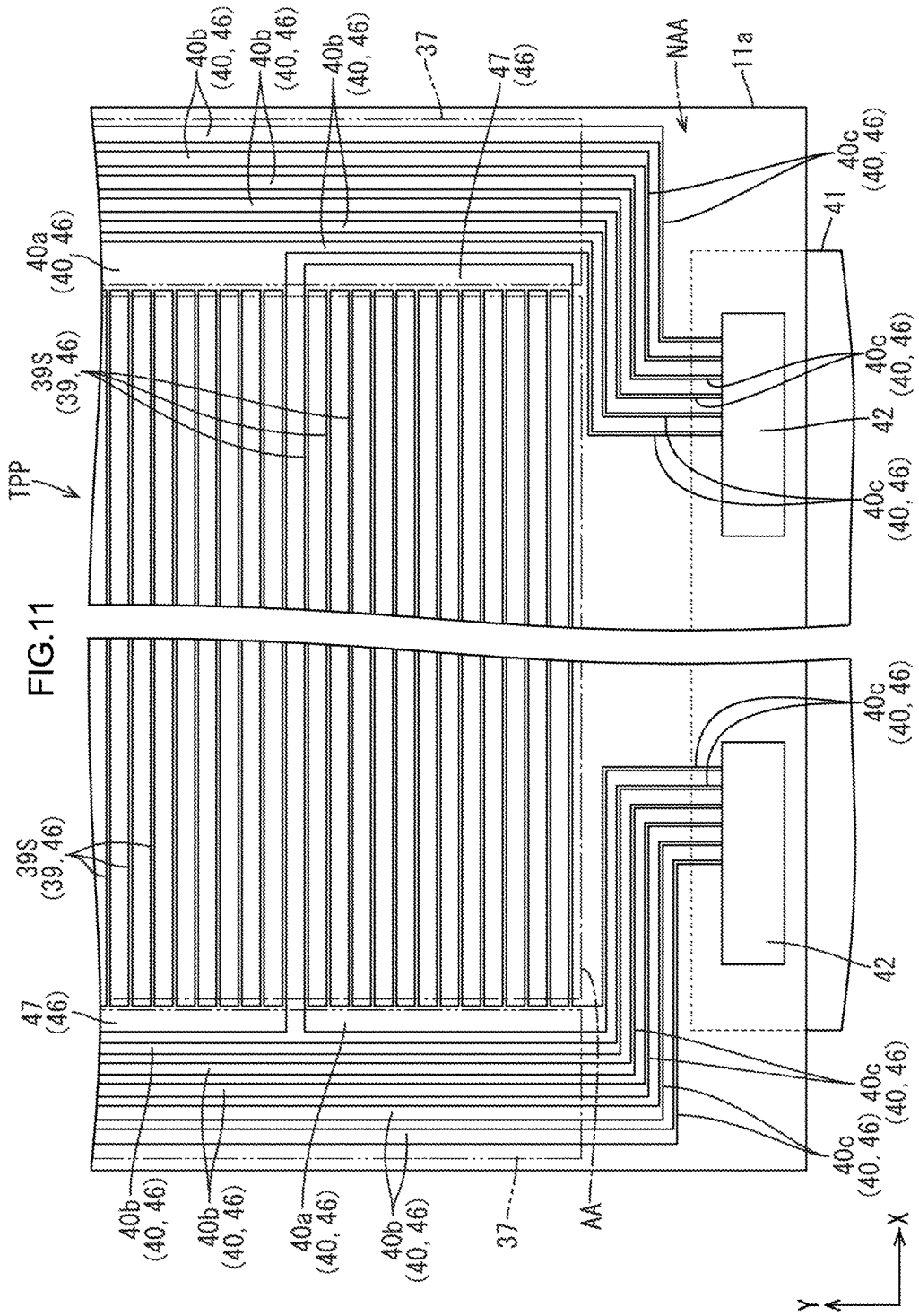
FIG. 11 is a bottom view illustrating the edge-side portions of the CF board with respect to the short-side direction, the edge-side portions are on the terminal-side edge portion with respect to the long-side direction.

As illustrated in FIGS. 10 and 11, the width of each of the second line portions 40*b* differs from each other according to the driving electrode 39 to be connected. Specifically, the position detection line portions 40 are configured as follows. The width of the first line portions 40*a* and the width of the third line portions 40*c* are substantially constant for all the driving electrodes 39 to be connected. The width of the second line portions 40*b* is reduced as it is to be connected to the driving electrode 39 closer to the CF board side contact portion 42 and the width of the second line portions 40*b* is increased as it is to be connected to the driving electrode 39 farther from the CF board side contact portion 42. The position detection line portion 40 to be connected to the driving electrode 39 farther from the CF board side contact portions 42 has an extending distance relatively longer than that of the position detection line portion 40 to be connected to the driving electrode 39 close to the CF board side contact portions 42. Therefore, the position detection line portion 40 to be connected to the driving electrode 39 farther from the CF board side contact portion 42 has high tracing resistance. However, the width of the second line portions 40b is relatively large and the tracing resistance can be lowered. Accordingly, difference between the tracing resistance that may be generated in the position detection line portions 40 connected to the driving electrodes 39 farther from the CF board side contact portion 42 and the tracing resistance that may be generated in the position detection line portion 40 to be connected to the driving electrode 39 close to the CF board side contact portions 42 can be small. Accordingly, the position detecting properties are less likely to be deteriorated. The dimension of the first line portions 40a of the position detection line portion 40 in the Y-axis direction (the width) is constant. The dimension of the first line portions 40a in the X-axis direction is decreased as it is connected to the driving electrode 39 closer to the CF board side contact portion 42.

Next, the films that are arranged on the inner surface of the CF board 11a (on the liquid crystal layer 11c side, on a surface opposite the array board 11b) with the known photolithography method will be described. As illustrated in FIGS. 7 and 8, the light blocking portion 25 and the color filter 24, the metal film 46, and the flattening film 26 are arranged on in this order from the lower layer side (from the glass substrate GS side, from the front side). The alignment films, which are not illustrated, are arranged on the upper layer side of the flattening film 26. In this embodiment, photospacer portions, which are not illustrated, are disposed on the upper layer side of the flattening film 26. The photospacer portions have a columnar shape extending through the liquid crystal layer 11c toward the array board 11b to keep a constant cell gap in the display area AA.

Figure 14:
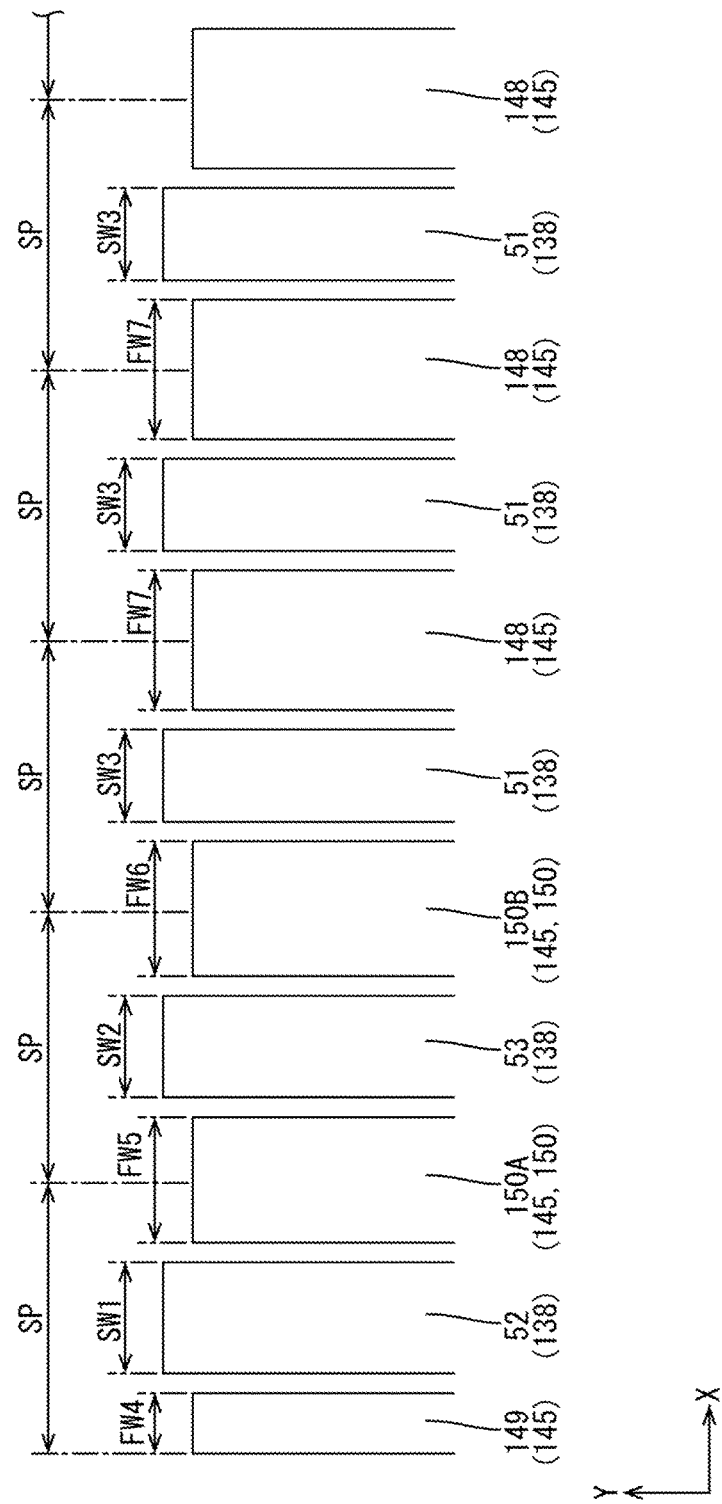
FIG. 14 is a plan view illustrating detection electrodes and floating electrodes having respective widths on the CF board according to a second embodiment of the present technology.

As illustrated in FIGS. 7 and 8, the light blocking portion 25 disposed on the front surface of the glass substrate GS of the CF board 11a and extends over the display area AA and the non-display area NAA. The light blocking portion 25 is made of photosensitive resin containing a light blocking material (such as carbon black) and has high light blocking properties. The light blocking portion 25 is formed in a grid in a plan view with patterning in the display area AA and is formed in a frame shape in a plan view with patterning in the non-display area NAA. The light blocking portion 25 disposed in the display area AA includes portions extending in the Y-axis direction and portions extending in the X-axis direction that are connected to each other to define the color pixel portions PX. Specifically, as illustrated in FIG. 12, in the display area AA, the potions of the light blocking portion 25 extending in the Y-axis direction are arranged at intervals in the X-axis direction (an arrangement pitch in the X-axis direction) and each of the intervals corresponds to a short-side dimension of the color pixel portion PX. The portions of the light blocking portion 25 extending in the X-axis direction are arranged at intervals in the Y-axis direction (an arrangement pitch in the Y-axis direction) and each of the intervals corresponds to a long-side dimension of the color pixel portion PX. As illustrated in FIGS. 7 and 8, the color filter 24 is disposed in the display area AA and is formed in an island form with patterning corresponding to the arrangement of the pixel electrodes 20 on the array board 11b. Specifically, the color filter 24 includes color portions that are arranged in a matrix to overlap the respective pixel electrodes 20 on the array board 11b in a plan view in the display area AA of the CF board 11a. Each of the color portions has a vertically elongated rectangular plan view shape (not illustrated). The color filter 24 includes the color portions exhibiting red, green, and blue that are alternately and repeatedly arranged in a row (the X-axis direction) to forma color portion group. The color portion groups are arranged in a column direction (the Y-axis direction) to form the color filter 24. The adjacent color portions in the display area AA are defined by the light blocking portion 25 formed in a grid and the color pixel portions PX are less likely to be mixed. The metal film 46 is arranged on the upper layer side of the light blocking portion 25. The metal film 46 is formed in a horizontal striped pattern in the display area AA to overlap the portions of the grid-shaped light blocking portion 25 extending in the X-axis direction. Thus, the driving electrodes 39 are formed (FIG. 14). The portions of the metal film 46 disposed in the non-display area NAA include the position detection line portions 40, the CF board side contact portions 42, and the dummy line portions 47. The flattening film 26 is arranged on the upper layer side of the light blocking portion 25, the color filter 24, and the metal film 46 and is formed in a solid pattern extending over the display area AA and the non-display area NAA. The flattening film 26 is made of acrylic resin such as polymethyl methacrylate (PMMA). The flattening film 26 has a thickness greater than that of the color filter 24, the light blocking portion 25, and the metal film 46 so as to effectively flatten a surface of the CF board 11a facing the liquid crystal layer 11c (where the alignment film is disposed). The flattening film 26 is disposed to cover the driving electrodes 39, the position detection line portions 40, and the dummy line portions 47 that are formed of the metal film 46 from the array board 11b side.

In the prior art configuration, the floating electrodes that are arranged in the X-axis direction have the same width except for the ones disposed at the two ends, and the floating electrodes on the two ends have an approximately half of the width of the ones disposed in the middle portion. Therefore, difference between the electrostatic capacitance of the detection electrode at the end in the X-axis direction and the detection electrode adjacent to the end-side detection electrode tends to be relatively greater than difference between the electrostatic capacitance of the adjacent detection electrodes in the X-axis direction in the middle portion. If a detection method of obtaining difference in the capacitance values of the detection electrodes that are adjacent to each other in the X-axis direction is used for detecting touch positions to improve the noise resistance, large noise may be caused due to the great difference in the electrostatic capacitance as described before. Accordingly, the position detection sensitivity may be deteriorated locally at the end portions in the X-axis direction. The method of obtaining difference in the capacitance values of the adjacent detection electrodes 38 in the X-axis direction according to this embodiment is disclosed in Japanese Patent Application Publication No. 2013-3603 and the entire contents thereof are incorporated herein by reference.

Figure 13:
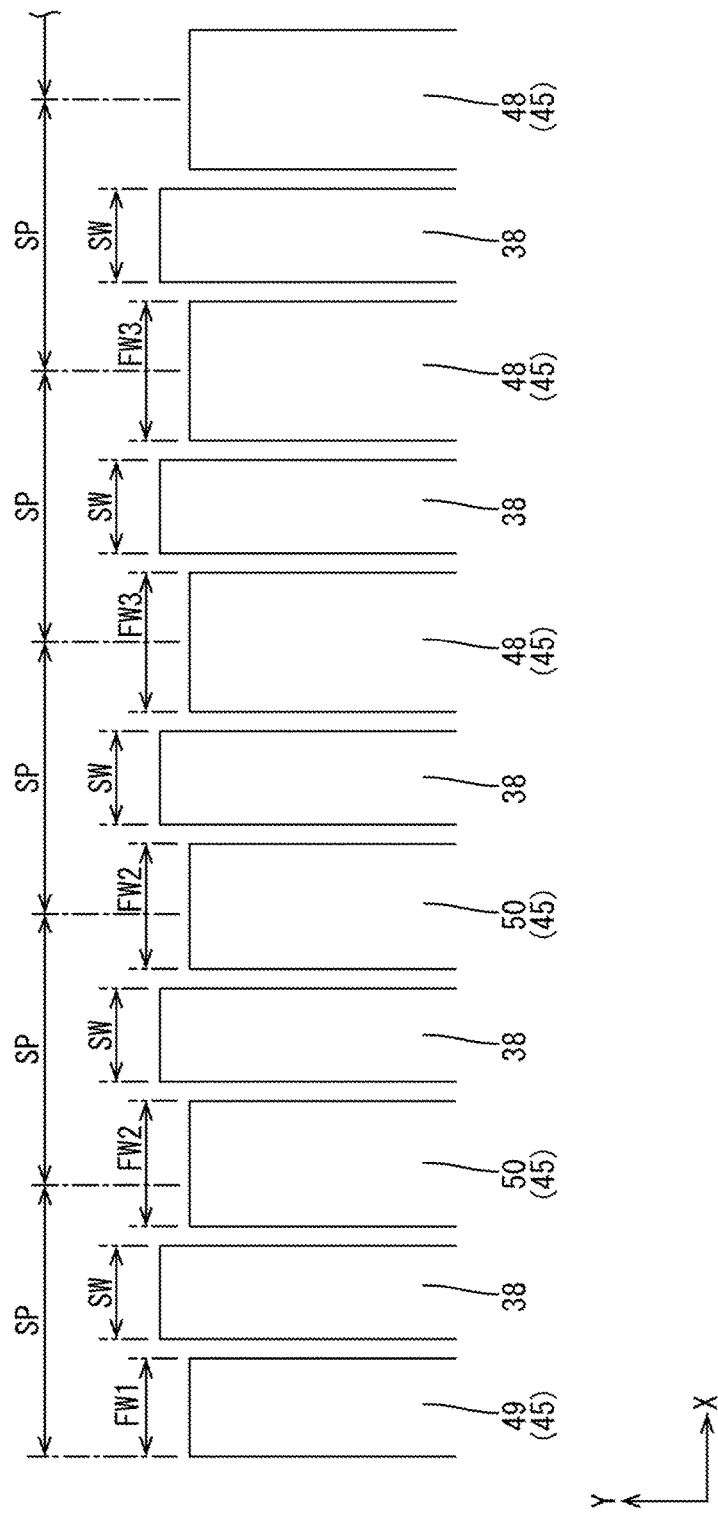
FIG. 13 is a plan view illustrating detection electrodes and floating electrodes having respective widths on the CF board.

In this embodiment, as illustrated in FIGS. 9 and 13, the floating electrodes 45 include a reference width floating electrode 48, a smallest width floating electrode 49, and an intermediate width floating electrode 50. The reference width floating electrode 48 has a reference width FW3. The smallest width floating electrode 49 has a smallest width FW1 and is disposed at an end in the X-axis direction (the second direction). The intermediate width floating electrode 50 has a width FW2 that is smaller than the width FW3 of the reference width floating electrode 48 and greater than the width FW1 of the smallest width floating electrode 49. The intermediate width floating electrode 50 is disposed closer to the end than the reference floating electrode 48 is and closer to the middle than the smallest floating electrode 49 is. According to such a configuration, compared to difference between the electrostatic capacitance produced between the smallest width floating electrode 49 and its adjacent detection electrode 38 and the electrostatic capacitance produced between the reference width floating electrode 48 and its adjacent detection electrode 38, difference between the electrostatic capacitance produced between the smallest width floating electrode 49 and its adjacent detection electrode 38 and the electrostatic capacitance produced between the intermediate floating electrode 50 and its adjacent detection electrode 38 is relatively small, and difference between the electrostatic capacitance produced between the reference width floating electrode 48 and its adjacent detection electrode 38 and the electrostatic capacitance produced between the intermediate floating electrode 50 and its adjacent detection electrode 38 is relatively small. The intermediate width floating electrodes 50 are disposed between the reference width floating electrode 48 and the smallest floating electrode 49 in the X-axis direction. With such a configuration, the capacitance values of the electrostatic capacitance produced between each of the floating electrodes 48 to 50 and each of the detection electrodes 38 arranged in the X-axis direction are equalized. Accordingly, extreme difference in the capacitance values is less likely to be caused at the end in the X-axis direction. Therefore, the detection electrode 38 at the end in the X-axis direction is less likely to be affected by noise in detecting positions and the position detection sensitivity is less likely to be deteriorated locally at the end in the X-axis direction. Each of the floating electrodes 48 to 50 is configured to satisfy the following inequality as to the widths FW1 to FW3: FW1<FW2<FW3.

In this embodiment, the floating electrodes 45 have three types of widths including the widths FW1 to FW3 as described before. The detection electrodes 38 that are adjacent to the floating electrodes 45 in the X-axis direction have the same width SW, as illustrated in FIG. 13. If the detection electrode disposed at the end in the X-axis direction has a width greater than that of other detection electrodes, a total area of the floating electrodes is reduced by the increased width of the end-side detection electrode. However, with the above configuration of this embodiment, a total area of the floating electrodes 45 can be same as those of the prior art configuration.

Next, relation of the widths of the floating electrodes 48 to 50 will be described in detail. First, the smallest width floating electrode 49 is configured to have the width FW1 that is greater than a half of the width FW2 of the intermediate width floating electrode 50. In the prior art configuration, the floating electrodes at the two ends in the X-axis direction have a width that is approximately a half of the width of the floating electrode disposed in the middle. Compared to such a prior art configuration, in this embodiment, difference between the width FW1 of the smallest width floating electrode 49 and the width FW2 of the intermediate width floating electrode 50 is effectively small and therefore, the difference in the capacitance values that may be caused at the ends in the X-axis direction can be small. As illustrated in FIGS. 4 and 9, the smallest width floating electrodes 49 are arranged in a pair at the respective two ends in the X-axis direction within a plate surface area of the CF board 11a. The smallest width floating electrode 49 and the intermediate width floating electrode 50 are configured to satisfy the following inequality relating the widths FW1 and FW2: (FW2/2)<FW1.

Two intermediate width floating electrodes 50 having the same width FW2 are arranged to sandwich the detection electrode 38 therebetween in the X-axis direction. Therefore, the configuration of the floating electrodes 45 is simplified compared to a configuration in that two intermediate width floating electrodes having different widths are arranged. Specifically, a second one and a third one of the floating electrodes 45 from the end in the X-axis direction are the intermediate width floating electrodes 50 having the same width FW2. The two intermediate width floating electrodes 50 are disposed at the second one and the third one from each end in the X-axis direction among the floating electrodes 45. Therefore, the reference width floating electrode 48 is disposed at the fourth one and its subsequent ones from each end in the X-axis direction among the floating electrodes 45. As illustrated in FIGS. 4 and 9, two intermediate width floating electrodes 50 are arranged in a pair at the respective two ends in the X-axis direction within a plate surface area of the CF board 11a.

Among the detection electrodes 38, the detection electrode 38 that is between two reference width floating electrodes 48 in the X-axis direction has a center with respect to the X-axis direction coincides with a middle position between the two reference width floating electrodes 48. However, the detection electrode 38 adjacent to the smallest width floating electrode 49 in the X-axis direction has a center with respect to the X-axis direction shifted from the middle position between the two floating electrodes 45 sandwiching the detection electrode 38 toward the end with respect to the X-axis direction. The detection electrode 38 adjacent to the intermediate width floating electrode 50 in the X-axis direction also has a center with respect to the X-axis direction shifted from the middle position between the two floating electrodes 45 sandwiching the detection electrode 38 toward the end with respect to the X-axis direction. Specifically, the detection electrode 38 sandwiched between the intermediate width floating electrode 50 and the reference width floating electrode 48 (the third one of the detection electrodes 38 from the left end in FIG. 13) has a center with respect to the X-axis direction shifted from the middle position between the intermediate width floating electrode 50 and the reference width floating electrode 48 toward the end in the X-axis direction. The detection electrode 38 sandwiched between the two intermediate width floating electrodes 50 (the second one of the detection electrodes 38 from the left end in FIG. 13) has a center with respect to the X-axis direction shifted from the middle position between the two intermediate width floating electrodes 50 toward the end with respect to the X-axis direction. The detection electrode 38 sandwiched between the smallest width floating electrode 49 and the intermediate width floating electrode 50 (the left-end one of the detection electrodes 38 in FIG. 13) has a center with respect to the X-axis direction shifted from the middle position between the smallest width floating electrode 49 and the intermediate width floating electrode 50 toward the end with respect to the X-axis direction. Each of the detection electrodes 38 arranged in the X-axis direction has a same position detection range (a same sensor pitch) with respect to the X-axis direction. Therefore, the detection electrode 38 adjacent to the intermediate width floating electrode 50 or the smallest width floating electrode 49 with respect to the X-axis direction has a center shifted from a center of the position detection range with respect to the X-axis direction toward the middle portion.

In this embodiment, the intermediate width floating electrode 50 is configured such that difference between the width FW2 thereof and the width FW3 of the reference width floating electrode 48 is smaller than difference between the width FW2 thereof and the width FW1 of the smallest width floating electrode 49. Namely, the floating electrodes 48 to 50 are configured to satisfy the following inequality relating the widths FW1 to FW3: FW3−FW2<FW2−FW1. In this embodiment, the intermediate width floating electrode 50 is configured such that the width FW2 thereof and the width FW3 of the reference width floating electrode 48 is equal to a half value of difference between the width FW2 thereof and the width FW1 of the smallest width floating electrode 49. Namely, the floating electrodes 48 to 50 are configured to satisfy the following equality relating the widths FW1 to FW3: FW3−FW2=(FW2−FW1)/2. In this embodiment, the smallest width floating electrode 49 is configured such that the width FW1 thereof is greater than the width SW of the detection electrode 38. Namely, the smallest width floating electrode 49 and the detection electrode 38 are configured to satisfy the following inequality relating the widths FW1 and SW: SW<FW1.

In this embodiment, the width SW of the detection electrode 38 is approximately 2000 μm, for example, the width FW3 of the reference width floating electrode 48 is approximately 3000 μm, for example, the width FW1 of the smallest width floating electrode 49 is approximately 2100 μm, for example, the width FW2 of the intermediate floating electrode 50 is approximately 2700 μm, for example, and the position detection range (the sensor pitch) SP of each of the detection electrodes 38 arranged in the X-axis direction is approximately 5000 μm, for example.

As described before, the touch panel pattern (a position input device) TPP of this embodiment includes the detection electrodes (first position detection electrodes) 38, the driving electrodes (second position detection electrodes) 39, floating electrodes 45, the reference width floating electrode 48 included in the floating electrodes 45, a smallest width floating electrode 49 included in the floating electrodes 45, and an intermediate width floating electrode 50 included in the floating electrodes 45. The detection electrodes 38 extend in the first direction (the Y-axis direction) and are arranged in the second direction (the X-axis direction) that is perpendicular to the first direction. The driving electrodes 39 extend in the second direction and are arranged in the first direction to include portions overlapping the respective detection electrodes 38 in a plan view. The electrostatic capacitance is produced between the driving electrodes 39 and the detection electrodes 38. The floating electrodes 45 are disposed adjacent to the respective detection electrodes 38 in a plan view. Electrostatic capacitance is produced between the floating electrodes 45 and the detection electrodes 38 disposed to include portions overlapping the respective driving electrodes 39 in a plan view and adjacent to the driving electrodes 39. Electrostatic capacity is produced between the floating electrodes 45 and the driving electrodes 39 overlapping the detection electrodes 38. The smallest width floating electrode 49 is disposed at the end among the floating electrodes 45 in the second direction and has the smallest width FW1. The intermediate width floating electrode 50 is disposed closer to the end than the reference width floating electrode 48 is with respect to the second direction and is disposed closer to the middle than the smallest width floating electrode 49 is. The intermediate width floating electrode 50 has the width FW2 that is smaller than the width of the reference width floating electrode 48 and greater than the width of the smallest width floating electrode 49.

Accordingly, electrostatic capacitance is produced between the detection electrode 38 and the driving electrode 39 that overlaps the detection electrode 38. Further, electrostatic capacitance is produced between the floating electrode 45 and the detection electrode 38 adjacent to the floating electrode 45 and between the floating electrode 45 and the driving electrode 39 overlapping the floating electrode 45. Therefore, the position detection sensitivity (S/N ratio) is increased. Among the detection electrodes 38 arranged in the second direction, electrostatic capacitance produced between the end-side one of the detection electrodes 38 in the second direction and the adjacent floating electrode 45 is relatively small compared to electrostatic capacitance produced between the middle-side one of the detection electrodes 38 and the adjacent floating electrode 45 and the difference between the capacitance values tends to be increased. Therefore, great noise may be caused in detecting positions and the position detection sensitivity may be locally lowered. The floating electrodes 45 includes the intermediate width floating electrode 50 that is arranged closer to the end-side one than the reference width floating electrode 48 is with respect to the second direction and arranged closer to the middle than the end-side smallest width floating electrode 49 is. The intermediate width floating electrode 50 has the width FW2 smaller than the width of the reference width floating electrode 48 and greater than the width of the smallest floating electrode 49. Therefore, the capacitance values of the electrostatic capacitance produced between the detection electrodes 38 arranged in the second direction and the respective floating electrodes 45 are equalized and extreme difference of the capacitance values is less likely to be caused at the end portion in the second direction. Accordingly, the detection electrode 38 is less likely to be affected by the noise at the end portion in the second direction in detecting positions. The position detection sensitivity is less likely to be lowered locally at the end portion with respect to the second direction.

The detection electrodes 38 have the same width SW. Accordingly, the total area of the floating electrodes 45 is equal to that of the prior art configuration compared to a configuration in that a width of a detection electrode disposed at the end portion in the second direction is relatively large.

The smallest width floating electrode 49 has the width FW1 that is greater than a half value of the width FW2 of the intermediate width floating electrode 50. Accordingly, difference between the width FW1 of the smallest width floating electrode 49 and the width FW2 of the intermediate floating electrode 50 is effectively small. Therefore, difference between the capacitance values that may be caused at the end portion in the second direction is less likely to be caused.

At least two intermediate width floating electrodes 50 having the same width FW2 are arranged to sandwich the detection electrode 38 in the second direction. Accordingly, the configuration is simplified compared to a configuration including intermediate width floating electrodes having different widths.

The liquid crystal display device (the display device having a position input function) 10 according to this embodiment at least includes the touch panel pattern TPP and the liquid crystal panel (a display panel) 11 including the ouch panel pattern TPP.

According to such a display device having a position input function including the liquid crystal panel 11 and the touch panel pattern TPP, the position inputting by a user and the display on the liquid crystal panel 11 are performed in connection with each other smoothly and feeling of use is improved.

The liquid crystal panel 11 includes the array board 11b and the CF board (the counter substrate) 11a. The array board 11b at least includes the TFTs (the display elements) 19 that are arranged in the display area AA where images are displayed. The CF board 11a is disposed opposite the array board 11b having a distance therebetween. In the touch panel pattern TPP, the driving electrodes 39 are disposed in the display area AA on the plate surface of the CF board 11a facing the array board 11b. The detection electrodes 38 and the floating electrodes 45 are disposed in the display area AA on the plate surface of the CF board 11a opposite from the surface facing the array board 11b. Thus, the touch panel pattern TPP is provided integrally with the liquid crystal panel 11. The touch panel pattern TPP is provided integrally with the liquid crystal panel 11 and therefore, the liquid crystal display device 10 is effectively reduced in thickness and cost compared to a configuration in that the touch panel pattern is included in a touch panel that is a separate component from the liquid crystal panel 11.

Second Embodiment

The second embodiment will be described with reference to FIG. 14. In the second embodiment, a width of a detection electrode 138 and a width of a floating electrode 145 are altered. The configurations, operations, and effects same as those in the first embodiment will not be described.

As illustrated in FIG. 14, detection electrodes 138 of this embodiment include reference width detection electrodes 51 having a reference width SW3, a largest width detection electrode 52, and an intermediate width detection electrode 53. The largest width detection electrode 52 is disposed at an end-side in the X-axis direction (the second direction) and has a largest width SW1. The intermediate width detection electrode 53 is disposed closer to the end than the reference detection electrode 51 is and closer to the middle than the largest width detection electrode 52 is with respect to the X-axis direction. The intermediate width detection electrode 53 has a width SW2 greater than the width SW3 of the reference width detection electrode 51 and smaller than the width SW1 of the largest width detection electrode 52. Compared to difference between electrostatic capacitance produced between the smallest width floating electrode 149 and the adjacent largest width detection electrode 52 and electrostatic capacitance produced between the reference width floating electrode 148 and the adjacent reference width detection electrode 51, following effects are obtained with the above configuration. Difference between the electrostatic capacitance produced between the smallest width floating electrode 149 and the adjacent largest width detection electrode 52 and the electrostatic capacitance produced between the intermediate width floating electrode 150 and the adjacent intermediate detection electrode 53 is relatively small. Difference between the electrostatic capacitance produced between the reference width floating electrode 148 and the adjacent reference width detection electrode 51 and the electrostatic capacitance produced between the intermediate width floating electrode 150 and the adjacent intermediate detection electrode 53 is relatively small. The intermediate detection electrode 53 is disposed between the reference width detection electrode 51 and the largest width detection electrode 52 with respect to the X-axis direction. With such a configuration, the capacitance values of the electrostatic capacitance produced between each of the detection electrodes 51 to 53 and each of the floating electrodes 148 to 150 arranged in the X-axis direction are equalized. Accordingly, extreme difference in the capacitance values is less likely to be caused at the end in the X-axis direction. Therefore, the detection electrode 138 at the end in the X-axis direction is less likely to be affected by noise in detecting positions and the position detection sensitivity is less likely to be deteriorated locally at the end in the X-axis direction. Each of the detection electrodes 51 to 53 is configured to satisfy the following inequality as to the widths SW1 to SW3: SW3<SW2<SW1.

In this embodiment, the intermediate width detection electrode 53 is disposed adjacent to the largest width detection electrode 52 on the middle side with respect to the X-axis direction. A second one of the detection electrodes 138 from each end-side one in the X-axis direction is the intermediate width detection electrode 53. Therefore, the third one and the subsequent ones from the end-side one of the detection electrodes 138 in the X-axis direction are reference width detection electrodes 51. The largest detection electrodes 52 are disposed in a pair at two end sides, respectively.

Next, relation between the width dimensions of the detection electrodes 51 to 53 will be described in detail. The intermediate width detection electrode 53 is configured such that difference between the width SW2 thereof and the width SW3 of the reference width detection electrode 51 is equal to difference between the width SW2 thereof and the width SW1 of the largest width detection electrode 52. According to such a configuration, the width SW2 of the intermediate width detection electrode 53 is an average value of the width SW3 of the reference width detection electrode 51 and the width SW1 of the largest width detection electrode 52. Therefore, the capacitance values of the electrostatic capacitance produced between each of the detection electrodes 51 to 53 and each of the floating electrodes 145 (148 to 150) that are arranged in the X-axis direction are further optimally equalized and difference between the capacitance values is less likely to be caused at the end portion with respect to the X-axis direction. The detection electrodes 51 to 53 are configured to satisfy the equation relating the widths SW1 to SW3: SW1−SW2=SW2−SW3.

The floating electrodes 145 include two intermediate width floating electrode 150 that have different widths FW5, FW6 and arranged to sandwich the detection electrode 138 with respect to the X-axis direction. Specifically, the intermediate width floating electrode 150 includes a first intermediate width floating electrode 150A having a relatively small width FW5 and a second intermediate width floating electrode 150B having a relatively large width FW6. The first intermediate width floating electrode 150A is the second one of the floating electrodes 145 from the left end one in FIG. 14. The second intermediate width floating electrode 150B is the third one of the floating electrodes 145 from the left end one in FIG. 14. The intermediate width detection electrode 53 is sandwiched between the first intermediate width floating electrode 150A and the second intermediate width floating electrode 150B. The first intermediate width floating electrode 150A and the second intermediate width floating electrode 150B have the respective widths FW5, FW6 that are larger than the width FW4 of the smallest width floating electrode 149 and smaller than the width FW7 of the reference width floating electrode 148. According to such a configuration, difference between the capacitance values that may be caused between the intermediate width detection electrode 53 sandwiched between the two intermediate width floating electrodes 150A and 150B having different widths FW5 and FW6 and the largest width detection electrode 52 adjacent to the smallest width floating electrode 149 can be optimally reduced compared to a configuration including two intermediate width floating electrodes 50 having the same width as is in the first embodiment. The floating electrodes 148 to 150 and the detection electrodes 51 to 53 are configured to satisfy the inequality relating the widths FW4 to FW7 and SW1 to SW3: FW4<SW3<SW2<SW1<FW5<FW6<FW7.

In this embodiment, the width SW3 of the reference width detection electrode 51 is approximately 2000 μm, for example, the width SW1 of the largest width detection electrode 52 is approximately 2400 μm, for example, the width SW2 of the intermediate detection electrode 53 is approximately 2200 μm, for example, the width FW7 of the reference width floating electrode 148 is approximately 3000 μm, for example, the width FW4 of the smallest floating electrode 149 is approximately 1300 μm, for example, the width FW5 of the first intermediate width floating electrode 150A is approximately 2700 μm, for example, the width FW6 of the second intermediate width floating electrode 150B is approximately 2900 μm, for example, and the position detection range (the sensor pitch) SP of each of the detection electrodes 138 arranged in the X-axis direction is approximately 5000 μm, for example.

As described before, according to the present embodiment, the detection electrodes 138 include the reference width detection electrode 51, the largest width detection electrode 52, and the intermediate width detection electrode 53. The largest width detection electrode 52 is disposed at the end-side in the second direction (the X-axis direction) and has the largest width SW1. The intermediate width detection electrode 53 is disposed closer to the end side than the reference width detection electrode 51 is and closer to the middle than the largest width detection electrode 52 is with respect to the second direction. The intermediate width detection electrode 53 has the width SW2 larger than that of the reference width detection electrode 51 and smaller than that of the largest width detection electrode 52. According to such a configuration, the detection electrodes 138 include the intermediate width detection electrode 53 that is disposed closer to the end side than the reference width detection electrode 51 is and closer to the middle than the end-side largest width detection electrode 52 is with respect to the second direction and has the width SW2 larger than that of the reference width detection electrode 51 and smaller than that of the largest width detection electrode 52. Therefore, the capacitance values of electrostatic capacitance generated between the detection electrodes 138 and the respective floating electrodes 145 that are arranged in the second direction are optimally equalized and difference between the capacitance values at the end-side portion with respect to the second direction is less likely to be caused.

The intermediate width detection electrode 53 is configured such that difference between the width SW2 thereof and the width SW3 of the reference width detection electrode 51 is equal to difference between the width SW2 thereof and the width SW1 of the largest width detection electrode 52. According to such a configuration, the width SW2 of the intermediate width detection electrode 53 is an average value of the width SW3 of the reference width detection electrode 51 and the width SW1 of the largest width detection electrode 52. Therefore, the capacitance values of the electrostatic capacitance produced between each of the detection electrodes 138 and each of the floating electrodes 145 that are arranged in the second direction are further optimally equalized and difference between the capacitance values is less likely to be caused at the end portion with respect to the second direction.

At least two intermediate width floating electrodes 150 that have different widths FW5, FW6 are arranged to sandwich the detection electrode 138 with respect to the second direction. According to such a configuration, difference between the capacitance values that may be caused between the detection electrode 138 (the intermediate width detection electrode 53) sandwiched between the two intermediate width floating electrodes 150 having different widths FW5 and FW6 and the detection electrode 138 (the largest width detection electrode 52) adjacent to the smallest width floating electrode 149 can be optimally reduced compared to a configuration including two intermediate width floating electrodes having the same width.

Other Embodiments

The present invention is not limited to the embodiment described above with reference to the drawings and the following embodiments may be included in the technical filed of the present invention.

(1) In the first embodiment, all of the detection electrodes have the same width and two intermediate width floating electrodes having the same width are disposed at each of the two ends with respect to the X-axis direction. However, all of the detection electrodes have the same width and one or three or more intermediate width floating electrodes having the same width may be disposed at each of the two ends with respect to the X-axis direction. Further, all of the detection electrodes have the same width and multiple intermediate floating electrodes having different widths may be disposed at each of the two ends with respect to the X-axis direction.

(2) As is in the first embodiment, all of the detection electrodes have the same width and multiple intermediate width floating electrodes having the same width may be disposed at each of the two ends with respect to the X-axis direction and multiple intermediate width floating electrodes having different widths may be disposed at each of the two ends.

(3) In the second embodiment, in the configuration including the detection electrodes having different widths, two intermediate width floating electrodes having different widths are disposed on each of the two ends in the X-axis direction. However, in the configuration including the detection electrodes having different widths, one or three or more intermediate width floating electrodes having different widths may be disposed at each of the two ends with respect to the X-axis direction. Further, in the configuration including the detection electrodes having different widths, multiple intermediate floating electrodes having the same width may be disposed at each of the two ends with respect to the X-axis direction.

(4) As is in the second embodiment, in the configuration including the detection electrodes having different widths, multiple intermediate width floating electrodes having the same width may be disposed at each of the two ends with respect to the X-axis direction and multiple intermediate width floating electrodes having different widths may be disposed at each of the two ends.

(5) In the second embodiment, one intermediate width detection electrode is disposed at each of the two ends with respect to the X-axis direction. However, multiple intermediate width detection electrodes may be disposed at each of the two ends with respect to the X-axis direction. In such a configuration, the intermediate width detection electrodes that are adjacent to each other in the X-axis direction may have different widths or may have the same width.

(6) Other than each of the above embodiments, relationship of a specific width size of the floating electrodes and a specific width size of the detection electrodes may be altered as necessary.

(7) In each of the above embodiments, the detection electrodes and the floating electrodes are arranged on an outer surface of the CF board. However, if a cover panel may be arranged on a front-surface side of the CF board, one of or both of the detection electrodes and the floating electrodes may be disposed on a plate surface of the cover panel opposite the CF board.

(8) In each of the above embodiments, the driving electrodes are arranged on the inner surface of the CF board. However, a common electrode disposed on the inner surface of the array board may be formed with patterning in a plane surface form similarly to the driving electrodes and commonly has a function of the driving electrode. In such a configuration, signals for display and signals for position detection may be input to the common electrode of the array board with a time lag.

(9) In each of the above embodiments, the liquid crystal panel (the FFS mode liquid crystal panel) includes the pixel electrodes and the common electrode arranged on the array board and overlapped with each other having an insulator therebetween. However, a liquid crystal panel (a VA mode liquid crystal panel) including the pixel electrodes on the array board and the common electrode on the CF board that are overlapped with each other with having the liquid crystal layer therebetween may be used as the liquid crystal panel. A so-called IPS mode liquid crystal panel may be used as the liquid crystal panel.

(10) In the configuration described in each of the above embodiments, the dummy line portions and the monolithic circuit portions may not be included.

(11) In each of the above embodiments, the touch area of the touch panel pattern corresponds to the display area of the liquid crystal panel. However, the touch area and the display area do not necessarily correspond to each other completely. For example, the touch area of the touch panel pattern may range over the entire area of the display area of the liquid crystal panel and a part of the non-display area (a part closer to the display area).

(12) In each of the above embodiments, the semiconductor film is made of a CG silicon thin film (a polycrystalline silicone film). Other than this, oxide semiconductor or amorphous silicon may be used as the material of the semiconductor film.

(13) In each of the above embodiments, the liquid crystal panel includes the color filter of three colors including red, green, and blue. However, the present invention may be applied to the configuration including the color filter of four colors including the yellow color section in addition to the red, green, and blue color sections.

(14) Each of the above embodiments is applied to the light transmissive type liquid crystal display device including the backlight device that is an external light source. The present invention may be applied to a reflection type liquid crystal display device displaying with using external light and in such a configuration, the backlight device may not be included. The present invention may be applied to a semi-transmissive type liquid crystal display device.

(15) In each of the above embodiments, the liquid crystal display panel that is classified as a small sized or a medium-small sized panel is used and such liquid crystal display panels are used in electronic devices such as mobile information terminals, mobile phones (including smart phones), laptop computers (including tablet-type laptop computers), a digital photo frame, and portable video game players. However, liquid crystal panels that have display size of from 20 inches to 90 inches and are classified as a middle sized or a large sized (extra-large sized) panels may be included in the scope of the present invention. Such a liquid crystal panel may be used in electronic devices such as a television device, an electronic signboard (digital signage), and an electronic blackboard.

(16) In each of the above embodiments, the liquid crystal panel is configured to include a pair of substrates and the liquid crystal layer between the substrates. However, a display panel including functional organic molecules other than the liquid crystal material between the substrates may be included in the scope of the present invention.

(17) In each of the above embodiments, the TFTs are used as the switching components of the liquid crystal panel. However, the technology described herein can be applied to liquid crystal display devices using switching components other than TFTs (e.g., thin film diodes (TFDs)). Furthermore, it can be applied to black-and-white liquid crystal display devices other than the color liquid crystal display device.

(18) In each of the above embodiments, the liquid crystal display device includes the liquid crystal panel as the display panel. The present invention may be applied to display devices using other kinds of display panels (PDP (plasma display panel, organic EL panel, EPD (electrophoresis display panel)). In such a configuration, the backlight device may not be included.

EXPLANATION OF SYMBOLS

10: liquid crystal display device (display device having a position input function), 11: liquid crystal panel (display panel), 11a: array board, 11b: CF board (counter substrate), 19: TFT (display element), 38, 138: detection electrode (first position detection electrode), 39: driving electrode (second position detection electrode), 45, 145: floating electrode, 48, 148: reference width floating electrode, 49, 149: smallest width floating electrode, 50, 150: intermediate width floating electrode, 51: reference width detection electrode (reference width first position detection electrode), 52: largest width detection electrode (largest width first position detection electrode), 53: intermediate width detection electrode (intermediate width first position detection electrode), AA: display area, TPP: touch panel pattern (position input device)

The invention claimed is:

1. A position inputting device comprising:
   first position detection electrodes extending in a first direction and arranged in a second direction that is perpendicular to the first direction;
   second position detection electrodes extending in the second direction and arranged in the first direction so as to include portions overlapping the first position detection electrodes in a plan view and, the second position detection electrodes and the first position detection electrodes producing an electrostatic capacitance therebetween; and
   floating electrodes arranged adjacent to the first position detection electrodes, respectively, in a plan view, and including portions overlapping the second position detection electrodes in a plan view, the floating electrodes and the first position detection electrodes adjacent thereto producing an electrostatic capacitance therebetween, and the floating electrodes and the second position detection electrodes overlapping the floating electrodes producing an electrostatic capacitance therebetween, the floating electrodes including a reference width floating electrode, a smallest width floating electrode, and an intermediate width floating electrode, the smallest width floating electrode disposed at an end-side one of the floating electrodes with respect to the second direction and having a smallest width, and the intermediate width floating electrode disposed closer to the end-side one than the reference width floating electrode is and closer to a middle than the smallest width floating electrode is with respect to the second direction and having a width smaller than that of the reference width floating electrode and larger than that of the smallest width floating electrode, wherein the first position detection electrodes include a reference width first position detection electrode, a largest width first position detection electrode, and an intermediate width first position detection electrode, the largest width first position detection electrode is disposed at an end-side one of the first position detection electrodes and has a largest width, and the intermediate width first position detection electrode is disposed closer to the end-side one than the reference width first position detection electrode is and closer to a than the largest width first position detection electrode is with respect to the second direction and has a width larger than that of the reference width first position detection electrode and smaller than that of the largest width first position detection electrode.

2. The position input device according to claim 1, wherein each of the first position detection electrodes has a same width.

3. The position input device according to claim 2, wherein the smallest width floating electrode is configured to have a width that is larger than a half of a width of the intermediate width floating electrode.

4. The position input device according to claim 2, wherein the intermediate width floating electrode includes at least two intermediate width floating electrodes having a same width and arranged to sandwich one of the first position detection electrodes therebetween.

5. The position input device according to claim 1, wherein the intermediate width first position detection electrode is configured such that difference between a width of the intermediate width first position detection electrode and a width of the reference width first position detection electrode is equal to difference between the width of the intermediate width first position detection electrode and a width of the largest width first position detection electrode.

6. The position input device according to claim 1, wherein the intermediate width floating electrode includes at least two intermediate width floating electrodes having different widths and the at least two intermediate floating electrodes are arranged to sandwich the first position detection electrode.

7. A display device having a position in put function comprising:

a position input device according to claim 1; and a display panel including the position input device.

8. A display device having a position input function according to claim 1, wherein a display panel includes an array board including at least displaying elements arranged in a display area displaying images and a counter substrate arranged opposite the array board while having a space therebetween, and the position input device is disposed integrally with at display panel such that the second position detection electrodes are disposed in the display area and on a plate surface of the counter substrate opposite the array board and the first position detection electrodes and the floating electrodes are disposed in the display area and on a plate surface of the counter substrate that is opposite from the plate surface opposite the array board.

* * * * *